US012696831B2

(12) United States Patent
Castilla-Rubio et al.

(10) Patent No.: US 12,696,831 B2
(45) Date of Patent: *Aug. 4, 2026

(54) AUTONOMOUS AGRICULTURAL VEHICLE SYSTEMS AND METHODS

(71) Applicant: MORAY TECNOLOGIA LTDA., São Paulo (BR)

(72) Inventors: Juan Carlos Castilla-Rubio, São Paulo (BR); Fabio Faria, São Paulo (BR); Fabiano Adegas, São Paulo (BR); Bruno Santos, São Paulo (BR); Yves Sakamoto, São Paulo (BR); Rodrigo Lopes, São Paulo (BR); Victor Vazquez, São Paulo (BR); Lucas de Cunto Costanzo, São Paulo (BR); David Peter Swan, Tyne & Wear (GB); Liam David Harrison, Tyne & Wear (GB)

(73) Assignee: MORAY TECNOLOGIA LTDA., São Paulo (BR)

( * ) Notice: Subject to any disclaimer, the term of this patent is extended or adjusted under 35 U.S.C. 154(b) by 0 days.

This patent is subject to a terminal disclaimer.

(21) Appl. No.: 18/787,461

(22) Filed: Jul. 29, 2024

(65) Prior Publication Data

US 2025/0031600 A1     Jan. 30, 2025

Related U.S. Application Data

(60) Provisional application No. 63/516,239, filed on Jul. 28, 2023.

(51) Int. Cl.
A01B 69/04        (2006.01)
A01B 69/00        (2006.01)
(Continued)

(52) U.S. Cl.
CPC .......... A01B 69/008 (2013.01); A01B 69/001 (2013.01); A01G 7/06 (2013.01);
(Continued)

(58) Field of Classification Search
CPC ...... A01B 69/008; A01B 69/001; A01G 7/06; G05D 1/229; G05D 1/689; G05D 2105/80;
(Continued)

(56) References Cited

U.S. PATENT DOCUMENTS

| | | | |
|---|---|---|---|
| 2021/0149406 A1* | 5/2021 | Javault | A01C 21/005 |
| 2021/0185885 A1* | 6/2021 | Sibley | A01B 69/001 |
| 2025/0143197 A1* | 5/2025 | Kinoshita | A01B 69/001 |

FOREIGN PATENT DOCUMENTS

| | | |
|---|---|---|
| BR | 102023008327 A2 | 4/2023 |
| CA | 3198821 A1 | 4/2022 |

(Continued)

OTHER PUBLICATIONS

International Search Report and Written Opinion dated Oct. 28, 2024 which was issued in connection with PCT/IB2024/057330.

(Continued)

*Primary Examiner* — Frederick M Brushaber
(74) *Attorney, Agent, or Firm* — Buckley, Maschoff & Talwalkar LLC

(57)        ABSTRACT

An agricultural autonomous vehicle is provided which is operable to traverse a field and perform one or more detection tasks.

19 Claims, 17 Drawing Sheets

(51) Int. Cl.

| | |
|---|---|
| *A01G 7/06* | (2006.01) |
| *G05D 1/229* | (2024.01) |
| *G05D 1/689* | (2024.01) |
| *G05D 105/80* | (2024.01) |
| *G05D 107/20* | (2024.01) |
| *G06V 20/10* | (2022.01) |
| *G06V 20/58* | (2022.01) |
| *H04N 23/90* | (2023.01) |

(52) U.S. Cl.
CPC ............. *G05D 1/229* (2024.01); *G05D 1/689* (2024.01); *G05D 2105/80* (2024.01); *G05D 2107/21* (2024.01); *G06V 20/188* (2022.01); *G06V 20/58* (2022.01); *H04N 23/90* (2023.01)

(58) Field of Classification Search
CPC .......... G05D 2107/21; G05D 2111/10; G05D 1/225; G05D 2109/10; G06V 20/188; G06V 20/58; H04N 23/90
See application file for complete search history.

(56) References Cited

FOREIGN PATENT DOCUMENTS

| | | | | |
|---|---|---|---|---|
| CN | 212344423 | U | 1/2021 | |
| CN | 114711212 | A | 7/2022 | |
| CN | 218302108 | U | 1/2023 | |
| CN | 114918945 | B | 9/2023 | |
| CN | 118892110 | A | 11/2024 | |
| EP | 4360419 | A1 * | 5/2024 | ........... A01B 69/008 |
| EP | 4410095 | A1 | 8/2024 | |
| EP | 4412441 | A1 | 8/2024 | |
| ES | 1260398 | U | 2/2021 | |
| FR | 2495432 | A1 | 6/1982 | |
| TW | 202523205 | B | 7/2024 | |
| WO | 2015023873 | A1 | 2/2015 | |

OTHER PUBLICATIONS

Brazilian Office Action dated Jan. 20, 2026 which was issued in connection with Brazilian Patent Application No. BR102025004264-9.

* cited by examiner

1300

1305

RECEIVE MISSION PLAN

1310

CONTROL AUTONOMOUS VEHICLE TO TRAVEL ALONG PATH DEFINED BY MISSION PLAN AND EXECUTE DETECTION TASKS

1315

PROCESS INFORMATION ASSOCIATED WITH DETECTION TASKS

1320

TRANSMIT RESULTS OF DETECTION TASKS AND META DATA FOR PROCESSING

AUTONOMOUS AGRICULTURAL VEHICLE SYSTEMS AND METHODS

CROSS REFERENCE

The present application claims priority to U.S. provisional application Ser. No. 63/516,239, which was filed on Jul. 28, 2023, the entire content of which is incorporated by reference herein in its entirety.

BACKGROUND

Farmers and other agricultural entities expend a tremendous amount of resources including time and money in order to plant, grow, and harvest crops. A typical farm may only have one or two growing seasons per year. If a harvest yield for farmland is poor during a single growing season, a farmer may lose a significant amount of money in terms of damaged and potentially unsellable crops. Accordingly, farmers are constantly seeking additional ways of simultaneously improving harvest yield while keeping costs reasonably low. Globally this problem translates to a USD 345 billion economic opportunity—annual global yield pest and disease losses in row crops of about USD 300 billion even though farmers invest USD 45 billion in pesticides and fungicides in the form of chemicals or through biotechnology traits in the seeds protecting against pests and diseases. This economic opportunity tends to grow exponentially as it becomes harder and more complex to deal effectively and efficiently with pests and diseases given the acceleration of the impact and frequency of weather extremes globally and especially in the large tropical food baskets of the world.

One way for farmers to improve harvest yield is by spraying certain chemicals, such as fungicides and/or pesticides, if disease or pests are damaging crops. Examples of disease to crops include fungi which may cause damage to the crops by killing cells and/or causing plant stress that may impede crop growth. Examples of pests which may adversely affect crop growth include various bugs such as caterpillars, white flies, grasshoppers, beetles, and so forth. If disease and/or pests are detected relatively quickly, fungicides and pesticides may be sprayed on affected crops before major damage has been caused to the crops generating a significant yield loss. However, if these issues are not detected in terms of species identified and their relative maturity in growth phase and/or addressed sufficiently quickly with a precise location and cost effectively, crop growth may be irreparably damaged, resulting in a reduced harvest yield.

Manual laborers and/or agricultural technicians may search and scout a field of crops and look for signs of diseases and/or pests, in which case the manual laborers may inform the application of particular types of pesticides and fungicides to address either of these issues. However, having manual laborers perform this task is typically slow, their specific pest and disease detections can vary significantly from person to person, sample the field at a low coarse rate and with a high revisit time to same location (less frequently), are expensive or not be available at all given labor shortages for trained technicians in farms worldwide. Moreover, such a manual process may be adversely affected by a manual laborer's skill, experience level, and/or the speed at which the manual laborer works. In some cases, an untrained manual laborer may lead to inaccurate field intelligence leading the field agronomist to decide on spraying the wrong type of pesticides or fungicides or other chemicals if a pest or fungi issue has been erroneously detected, if it has been detected in an unprecise location and with a time delay that may impact agricultural yield losses.

Some robotic systems, such as stand-alone systems and/or retrofits of real time detection and application capabilities in existent farming machinery, have been employed in recent years in which a robot travels along a crop row and acquires images or other data with or without onboard processing. However, such robotic systems have been exclusively limited to identifying weeds, not pests or diseases. The rationale behind this is that by definition weeds are much easier to identify and classify given they are much larger in size and are static (do not move like pests do, for example). Moreover, some of such robot systems continuously capture images or video while traveling at a relatively slow rate of speed, such as 1-2 km/hour. By travelling so slowly, however, it can take multiple days to inspect a field of crops leading to low sampling rate of the field and high revisit time. Existing solutions are also limited in operation as they are unable to perform detection at night. As a result of such slow movement and operational constraints, the presence of pests and diseases might not be identified until after they have already done irreparable harm to crops, resulting in potentially tremendous economic loss. Further, these systems can damage crops. For example, plant leaves or branches are typically destroyed as the vehicle passes through the field.

Further, existing systems are typically single purpose. For example, a system may be configured to perform specific detection or spraying functions. It would be desirable to provide an autonomous vehicle that is capable of sensing, detecting, classifying and acting on a variety of issues arising from pests, diseases, or nutritional issues across the crop cycle. Further, it would be desirable to provide such a system that is capable of operating at a high speed at all hours of the day or night without damaging crops.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
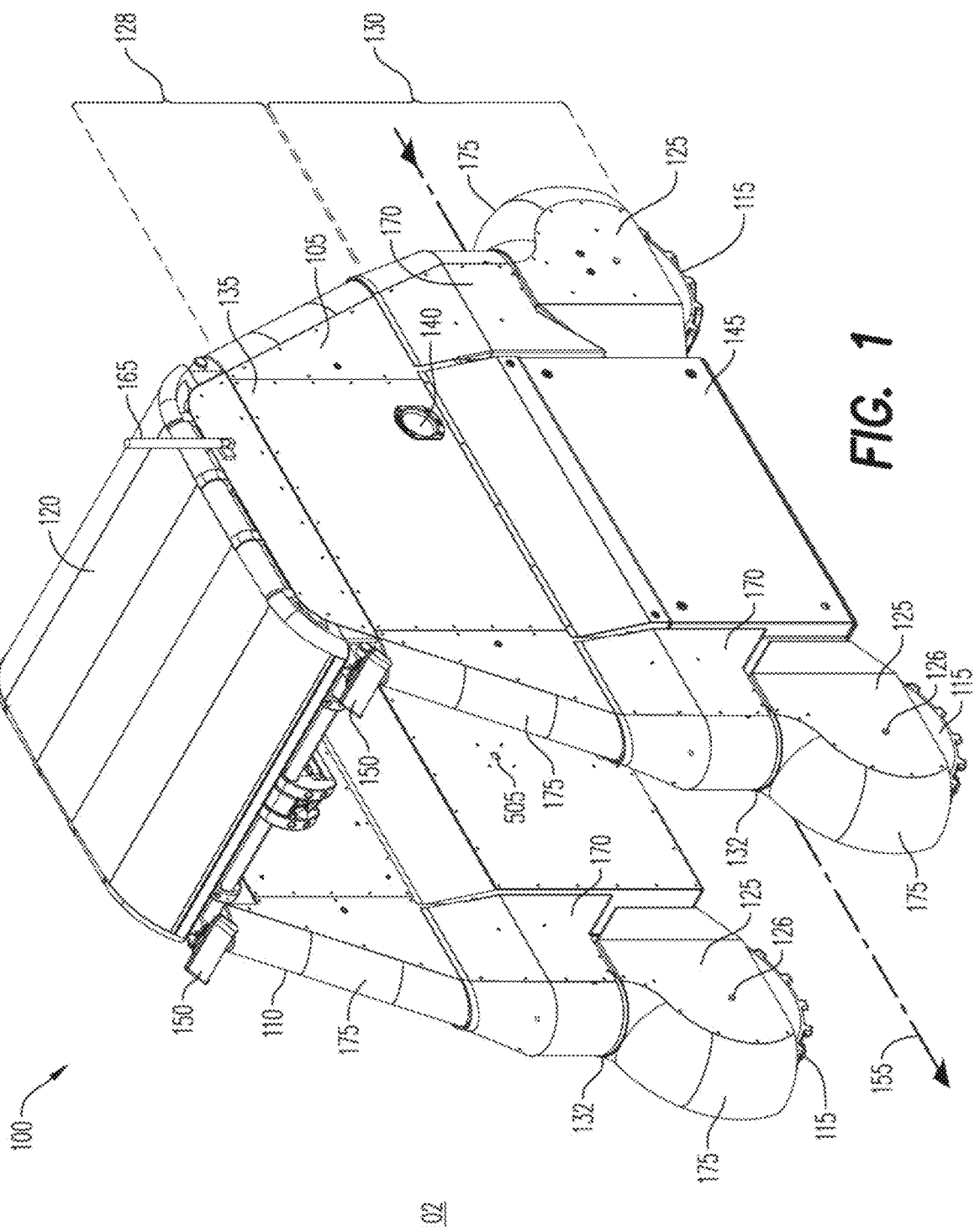
FIG. 1 is a first elevated perspective view of an autonomous vehicle according to an embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art, upon reading the following disclosure, will readily understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded a scope consistent with the principles and features disclosed herein.

In accordance with one or more embodiments, a system and method are provided for an autonomous vehicle or system for detecting and identifying insects or other pests or diseases (or symptoms of diseases) that could harm or otherwise damage crops. Pursuant to some embodiments, the systems and methods may be used for other detection actions as well (such as, for example, the detection or identification of attributes of plant growth, the detection or identification of weeds present among the crops, etc.). An autonomous vehicle may comprise a wheeled vehicle and a frame which travels along a row of crops so that the wheels are located on a dirt path on opposing sides of a row of crops and a body of the autonomous vehicle travels over the row of crops. The autonomous vehicle is configured to perform one or more detection actions while traversing a field. For example, one type of detection that will be described herein as an illustrative example are detection activities related to detecting the presence of diseases or pests.

Pursuant to some embodiments, the presence of pests, or the attributes of diseases that may cause crop damage may be identified from photographs or video ("images") captured while observing the crops. For example, a common type of disease is caused by fungi. If a crop is being affected by a fungal disease, there may be spots visible on the leaves of the crop. For example, certain fungi which are attacking a plant may result in the presence of certain spots on the leaves of the plant, such as white, red, or brown spots in some instances. Moreover, the shape and size of the spots may be markers indicating the type of fungus attacking the crop and how long or how much damage has been caused by the fungus. The presence of pests such as insects, as well as the type of pests and the amount of pests present, may be identified through the analysis of images (including both still images or photographs as well as videos) captured by the autonomous vehicle. For example, pursuant to some embodiments, one or more machine learning models may be deployed on an autonomous vehicle for use in performing inferencing processing to process images captured by the autonomous vehicle to identify and classify any pests or diseases present in the images. In some embodiments, the inferencing may be performed by one or more remote systems in communication with the autonomous vehicle. Those skilled in the art, upon reading the present disclosure, will appreciate that a number of different types of machine learning models may be used with the present invention to perform other detection tasks as described herein.

Pursuant to some embodiments, a group of autonomous vehicles may be programmed to follow a set of mission plans which defines a pre-defined path through a field of crops. The mission plan may be transmitted to the autonomous vehicle from a remote server or control system, and may specify both the pre-defined path as well as detection tasks or activities to be performed along the path. The autonomous vehicle, following the mission plan, may be configured to stop or slow down at pre-defined location(s) along the path in order to take one or more images from one or more cameras disposed on the body of the autonomous vehicle. For example, the autonomous vehicle may include various cameras disposed at different heights of the frame of the robot to capture images of a crop located in a horizontal or lateral direction from the frame. In some embodiments, there may also be one or more cameras disposed on an underside of the frame to take one or more photos of crops beneath the frame of the autonomous vehicle. The autonomous vehicle may also include selectively placed lighting devices, such as light emitting diodes (LEDs) or other illumination devices to ensure that optimal images are captured, even in dark or low-lighting conditions. In some embodiments, these lighting devices may be automatically controlled by the autonomous vehicle to operate in low or no-light conditions to ensure that images captured by the cameras are of high quality. Captured images may be associated with certain metadata or other information such as a geolocation indicating a location at which each image was captured as well as a timestamp indicating the date and time when each image was captured or acquired The autonomous vehicle may also include a computer processing capability to automatically analyze images to determine whether crop damage from any pests or diseases is detected or identified in the captured images (e.g., by providing the images as inputs to one or more machine learning models trained to classify or detect the presence of pests, diseases, crop damage, or to perform other detection actions). If, for example, such crop damage is detected, one or more messages may be transmitted from the autonomous vehicle to a server or other processing device to inform the server of the detected disease or pest, a location at which the pest or disease (or other attribute to be detected) was detected, an identification of the pest, disease or other attribute, which may include the type of disease detected and/or the type of pest detected, and the captured image to serve as proof to the detection action. The remote system may include one or more computer processors or systems to process messages received from an autonomous vehicle and formulate a response which may include spraying certain pesticides or other chemicals on the crops at the identified locations in order to control detected diseases and/or pests. The timing of spraying of pesticides, other chemicals or biologicals may be of critical importance because delays in such spraying may adversely affect crop growth, possibly permanently. Accordingly, by periodically transmitting messages from the autonomous vehicle to the server as the autonomous vehicle moves through one or more rows of crops along a pre-defined path, detected diseases and pests may be relatively quickly addressed.

In one or more embodiments, an autonomous vehicle may travel at a relatively fast speed along a path through a field of crops. For example, the autonomous vehicle may travel at a speed of 12-15 km/hour through a row of crops. In part, this is made possible by the mechanical design of the autonomous vehicle (which, as described further below, allows the vehicle to travel through crops without damaging the crop). This is also made possible by the autonomous nature of the vehicle which allows it to traverse rows in fields by following waypoints established in a mission plan in addition to relying on navigation autonomy capabilities for crop row and obstacle detection and recognition informing travel path. Further, the autonomous vehicle may perform operations at high speeds at any hour of day, as the vehicle is capable of operating in both light and dark conditions.

In some implementations, the autonomous vehicle may employ a sampling technique for capturing or acquiring images. For example, the autonomous vehicle may stop at periodic intervals, such as once every 100 m to take photos or video. In one implementation, the autonomous vehicle may include five cameras. Each of the cameras may capture one or more images (both while the vehicle is moving and while the vehicle is stopped). In some implementations, all of the cameras may capture images at the same times, whereas in other implementations, the cameras may capture images one at a time, such that a first camera captures an image and then a split second later, a second camera captures an image, and so forth. To ensure that optimal images are acquired and that a view of one or more of the cameras is not obscured, partially or fully, while capturing images, the autonomous vehicle may automatically be operated to advance a short distance, such as one meter, and take another series of images and then advance one additional meter and take a third set of images before advancing another 100 m to the next image acquisition site of the predefined path. By moving the autonomous vehicle at a relatively fast pace and stopping at defined locations to capture images, a number of detection tasks (such as detecting the presence of pests and diseases affecting crops) may be performed and addressed quickly.

Pursuant to some embodiments, a control system (such as a mobile control vehicle) may be in communication with one or more autonomous vehicles to provide mission plans to the autonomous vehicles and to receive the detection results from those vehicles. The control system may perform processing to aggregate and analyze the detection results from multiple passes on a field (from one or more autonomous vehicles) to generate a heat map or analysis of problem areas in the field. In this manner, embodiments allow the performance of a number of different detection tasks. The detection tasks are performed substantially automatically by one or more autonomous vehicles that are capable of operating for extended periods of time even in low or no-light conditions. Further, the autonomous vehicles of the present invention can perform such detection processes quickly and without damaging plants.

For convenience and ease of exposition, a number of terms are used herein. For example, the term "autonomous" is used to refer to a vehicle that is capable of operation without active physical control or monitoring by a human operator. As used herein, the term "autonomous" may also refer to semi-autonomous operation of a vehicle (e.g., where some human intervention may be required or possible during operation of the vehicle).

The term "image" or "images" is used to refer to pictures or videos obtained by a camera mounted on the autonomous vehicle of one or more embodiments.

The term "machine learning model" or "model" may be used to refer to a model trained to classify or detect patterns in one or more images. For example, a model may be a so-called "classification" model that is configured to receive and process image data and generate output data that "classifies" the image data (e.g., as including a type of pest or disease). As used herein, the term "classification model" can include various machine learning models, including but not limited to a "detection model" or a "regression model." Embodiments may be used with other models, and the use of a classification model as the illustrative example is intended to be illustrative but not limiting. As a result, the term "model" as used herein, is used to refer to any of a number of different types of models (from classification models to segmentation models or the like).

The term "mission plan" refers to a plan of operation that may be executed by the autonomous vehicle of the present invention. The "mission plan" may be provided to the vehicle in a file or other data structure that defines a number of geographical locations and actions to be taken by the autonomous vehicle. In some embodiments, the mission plan (as well as data collected during the execution of a mission by the autonomous vehicle) might be configured as robot operating system ("ROS") bagfiles compatible with the ROS™ by Open Robotics. Other data file configurations and structures might be used in other embodiments.

Further, while specific examples are provided herein describing the operation of the autonomous vehicle to perform tasks associated with the detection of the presence and location of pests or disease, embodiments are capable of performing a number of different tasks. For example, in some embodiments, the autonomous vehicle may be configured to capture information associated with one or more of: (i) the density of planting in an area, (ii) the morphology of planting in an area (e.g., to determine information such as leaf area on plants, height of plants, number and size of healthy fruits, etc.), and (iii) the quantity and quality of a crop in an area (e.g., to predict the economic yield of the crop). Pursuant to some embodiments, an autonomous vehicle of the present invention may execute each or any of these tasks based on information provided in a mission plan. For convenience, these tasks (including the tasks of detecting the presence and location of pests and diseases) will be referred to herein as "detection tasks".

FIG. 1 is a first elevated perspective view 102 of an autonomous vehicle 100 according to an embodiment. As discussed above, autonomous vehicle 100 may travel through an agricultural field, such as through one or more rows of crops and may acquire images (including, for example, photos or videos) of the crops to perform one or more detection tasks. For example, continuing the examples introduced above, the autonomous vehicle 100 may be controlled to substantially automatically traverse a field pursuant to a mission plan and perform operations to detect the presence of disease, such as fungi, and/or pests, such as insects, which may adversely affect the growth and health of the crops. The autonomous vehicle 100 may be programmed, under the direction of a mission plan, to travel a particular route through the field or a portion of a field. As will be discussed further below, the autonomous vehicle 100 is shaped such that it may travel along rows of crops while minimizing or substantially eliminating any damage to the crops. The plants of the rows of crops pass through a center portion of the autonomous vehicle 100 while wheels of the autonomous vehicle 100 travel along the rows on either side of the plants.

Figure 2:
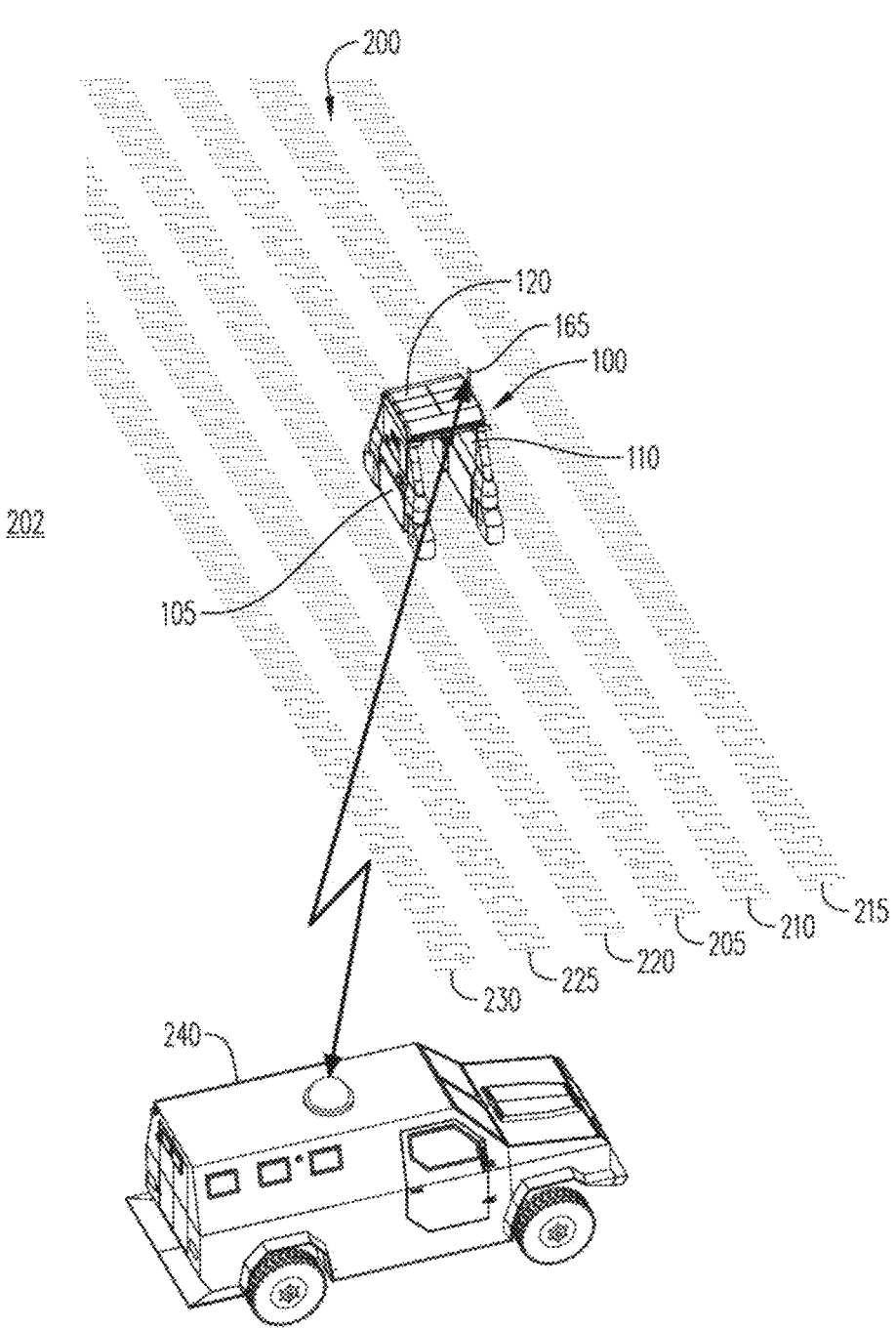
FIG. 2 illustrates an overhead view of autonomous vehicle and base station in an agricultural field according to an embodiment.
Figure 14:
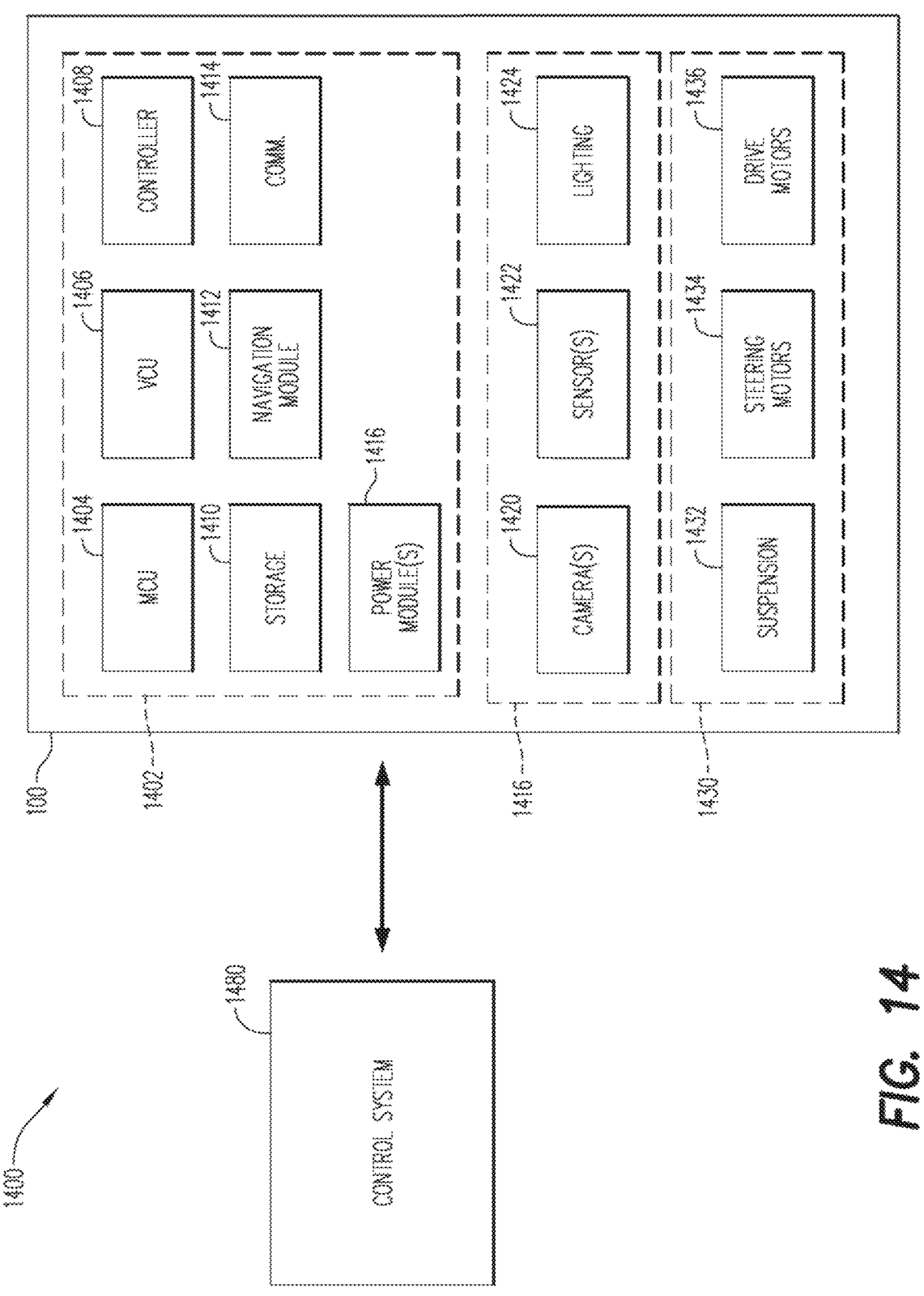
FIG. 14 illustrates a system pursuant to some embodiments

In some embodiments, programming that defines the route and specific detection tasks to be taken by the autonomous vehicle 100 is defined (at least in part) by the mission plan delivered to the autonomous vehicle 100 from a central control system or vehicle (e.g., such as the control system 1480 of FIG. 14, or the communications vehicle 240 of FIG. 2). For example, a mission plan may specify a defined path or route that may be comprised of a series of waypoints. A "waypoint," as used herein, refers to defined location along a path. Each waypoint, for example, may be identified by a geographic location. The geographic location may be specified by a global positioning system ("GPS") location or the like. For example, a defined path may include a series of waypoints which are located several meters or more apart. In some embodiments, a remote system (such as the control system 1480 of FIG. 14 or the communications vehicle 240 of FIG. 2) creates a mission plan by mapping a field and identifying one or more waypoints. Pursuant to some embodiments, one or more navigation cameras and other sensors may be provided on the autonomous vehicle 100. These devices may provide data to aid in navigating the autonomous vehicle 100 through a field. For example, in some embodiments, one or more stereoscopical depth cameras are deployed on the autonomous vehicle 100 to provide data that is used by a control system (shown as item 1402 of FIG. 14) of the autonomous vehicle 100 to assist the navigation of the autonomous vehicle 100. For example, these cameras and other sensors (such as LiDAR sensors) may provide fine tuning for row navigation and object detection for collision avoidance while executing a mission plan. In this manner, embodiments utilize GPS waypoints for coarse navigation and sensor data (such as from navigational cameras) for fine tuning of the navigation and collision avoidance. This allows the autonomous vehicle 100 to adjust to the actual field conditions, providing additional robustness and navigational accuracy, and further reducing crop damage.

The autonomous vehicle 100 may be programmed to travel to or through each of the waypoints. At certain waypoints, the autonomous vehicle 100 may stop (or slow down) and to perform one or more detection tasks. For example, the autonomous vehicle 100 may control the operation of one or more cameras or sensors to perform one or more detection tasks (e.g., such as controlling one or more cameras to capture images of plants proximate the autonomous vehicle 100). In some embodiments, the detection task may include both the operation of one or more cameras to take one or more images as well as inputting those images into one or more machine learning models to determine whether a pest, disease or other item of interest is present in the one or more images. In some embodiments, the detection task may further include the operation of one or more lighting devices in conjunction with the one or more cameras to compensate for any low lighting condition that may presently exist.

In some implementations, the autonomous vehicle 100 may operate the one or more cameras to take images at a waypoint, then travel a certain distance, such as one additional meter, operate the one or more cameras to take more images, and then travel an additional distance, such as one more meter, at which point one or more cameras may be operated to acquire one or more additional images. After operating the one or more cameras to take one or more images as specified by the mission plan, the autonomous vehicle 100 may subsequently travel to the next waypoint along the predefined path. Some waypoints may indicate that autonomous vehicle 100 is to change direction, such as to make a 90 degree turn. For example, if the autonomous vehicle 100 has reached the end of a row of crops, there may be a waypoint at which the autonomous vehicle 100 is to change direction of travel in order to reach the next row of crops. There may also be some waypoints at which the autonomous vehicle 100 is to continue travelling without stopping or changing directions. In some embodiments, the waypoints may be used to control both the movement and direction of the autonomous vehicle 100 as well as to indicate which detection tasks are to be performed at different locations.

While not shown in FIG. 1, the autonomous vehicle 100 includes a number of sensors and control systems allowing the autonomous vehicle 100 to be operated in an autonomous or semi-autonomous manner. For example, the autonomous vehicle 100 may include one or more navigation modules (shown as item 1412 of FIG. 14) which may be operated to capture information such as position data. For example, the sensors may include one or more satellite positioning sensors and/or inertial navigation systems such as GNSS/IMU. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU sensors may be used in conjunction with features of one or more embodiments of the present invention. The data collected by each of these sensors may be processed by a vehicle controller (shown in FIG. 14 as item 1408) to generate control signals that control the operation of the autonomous vehicle 100. For example, the vehicle controller may generate control signals to control the operation of one or more drive motors (shown in FIG. 14 as item 1436) and one or more steering motors (shown in FIG. 14 as item 1434) thereby causing the autonomous vehicle 100 to move along a path defined by a mission plan. As discussed above, additional sensors and devices may be provided which enhance the navigational accuracy of the autonomous vehicle 100. For example, in addition to the GNSS and IMU sensors, in some embodiments, the absolute encoders from the steering motors (shown as item 1434 of FIG. 14) may provide information such as wheel turning angles, and encoders from traction motors (giving wheel speed information, e.g., from the drive motors 1436 of FIG. 14) may provide information about the vehicle's speed. This data may be processed by the control system 1402 of FIG. 14 and may be processed using sensor fusion to further enhance the navigational control and accuracy of the autonomous vehicle 100. Some or all of the sensors and control systems may be mounted on the autonomous vehicle 100 within structural walls or other compartments of the autonomous vehicle 100 as will be discussed further below.

The autonomous vehicle 100 may include two walls (or legs, or also referred to as "structural walls") that extend downward from a roof resulting in a shape of the autonomous vehicle 100 that allows plants of a row of crops to pass between the two walls as the autonomous vehicle 100 travels along the row. As will be described further below, each wall is configured to reduce or substantially eliminate any damage to the plants as the autonomous vehicle 100 travels along the row (even when traveling at a high speed). As shown in FIG. 1, the two walls include a first structural wall 105 and second structural wall 110. Each structural wall 105, 110 may include two or more wheels disposed along the bottom of the structural wall 105, 110. A structural top 120 or roof may be disposed on a top end of the autonomous vehicle 100, extending between the first structural wall 105 and the second structural wall 110. The structural top 120 may be formed at least partially of a sturdy and strong material, such as a metal material to create a strong connection between the first structural wall 105 and the second structural wall 110. In some embodiments, the structural top 120 may be formed of panels which may be removed from the structural walls 105, 110 and replaced with panels of different sizes, allowing the effective width of the autonomous vehicle 100 to be modified. For example, the width of the vehicle 100 (e.g., the distance between structural wall 105 and structural wall 110) may be increased to execute a mission plan that involves larger plants or crops, and the width may be reduced to execute a mission plan that involves smaller plants or crops. As an illustrative, but not limiting example, the width of the autonomous vehicle 100 may be configured to allow the autonomous vehicle 100 to traverse crop rows that are 46 cm, 76 cm or 90 cm apart.

As shown in FIG. 1, the two walls 105, 110 have a distinctive shape that is wider at the bottom and narrower at the top (e.g., a leading and trailing edge of the walls extend diagonally up to the structural top 120). This shape minimizes any damage to plant foliage as the vehicle 100 passes along a row of crops. Other features of some embodiments which reduce or eliminate plant damage during operation of the autonomous vehicle 100 will be described further below.

Pursuant to some embodiments, the autonomous vehicle 100 is designed to minimize or substantially eliminate any damage to crops as the autonomous vehicle 100 traverses rows of a field. For example, as shown in FIG. 1, when viewed from one of the sides, the autonomous vehicle 100 has a shape that generally slopes upwards from the bottom of the autonomous vehicle 100 to the top of the autonomous vehicle 100. This shape enables the autonomous vehicle 100 to quickly travel through both immature and mature crops without snagging, snapping or otherwise damaging the limbs of the crop (as the shape of the autonomous vehicle 100 causes the limbs to be pushed upward, away from the wheels of the autonomous vehicle 100). Both the leading and trailing surfaces of the autonomous vehicle 100 have a similar shape, allowing the autonomous vehicle 100 to move in either direction without damaging crops. Further, as shown in FIG. 1, the leading and trailing surfaces of the autonomous vehicle 100 are covered by a bumper 175 which is formed with very few edges that may cause a branch, leaf or limb of a plant to be caught or snagged as the autonomous vehicle 100 passes through a field. In some embodiments, each bumper 175 may be formed using 3-D printing or other techniques that produce a rounded face that is not susceptible to snagging or catching crops. Each bumper 175 may be formed, for example, of a nylon material with carbon fibers or other materials.

As will be described further below, the autonomous vehicle 100 is further configured to reduce or eliminate damage to crops through the use of a steering and suspension system in which the wheels of the autonomous vehicle 100 can be turned and operated without catching or snagging plant leaves, limbs or branches. The result is an autonomous vehicle 100 that can quickly and efficiently traverse a field while capturing images or performing other tasks without damaging crops. As will be described further below, the autonomous vehicle 100 can perform such operations at all hours of the day and night.

Each structural wall 105, 110 may include wheels 115 disposed near a front end and a back end thereof and which enable movement of the autonomous vehicle 100. One or more of the wheels 115 may be partially encapsulated by a wheel cover 125 and a bumper 175. For example, the wheel cover 125 and the bumper 175 may encapsulate a majority of the surface area of the corresponding wheel 115. Each wheel 115 may have a particular tread suitable for operating autonomous vehicle robot 100 through relatively bumpy and rough agricultural fields. If the soil of a particular agricultural field is known to be relatively rocky a different wheel tread may be desirable versus use on another agricultural field known to have a high amount of clay soil, for example. In some embodiments, each wheel 115 may be approximately 40 cm in diameter, although different sizes may be used in different environments. Each wheel cover 125 may be formed of a sturdy material such as a hard plastic or metal and may extend below a midpoint of an axis of the wheel 115. The wheel cover 125 and bumper 175 may offer protection to a wheel 115 by, for example, preventing sticks, leaves, or other portions of a crop or other plant from being entangled around the wheel 115, such as around an axle thereof. Each wheel cover 125 may include a pin 126 or other component to secure the wheel cover 125 to an axle of wheel 115 to ensure that the wheel cover 125 has an ability to radially change direction in tandem with radial movement of wheel 115. For example, if wheel 115 rotates radially by 45 degrees in order to change direction, wheel cover 125 and bumper 175 may also rotate radially by 45 degrees. The wheel cover 125 may extend from a connection point 132 located above the top of wheel 115 to a position near the bottom of wheel 115, such as to a few inches above a bottom surface of wheel 115. For example, the amount of wheel 115 that is exposed may be less than 20 cm or about 17 cm to reduce potential damage to crops. The wheel cover 125 and bumper 175 (as well as other panels of the present invention) also provide protection to the internal wiring and hydraulic systems.

Figure 16:
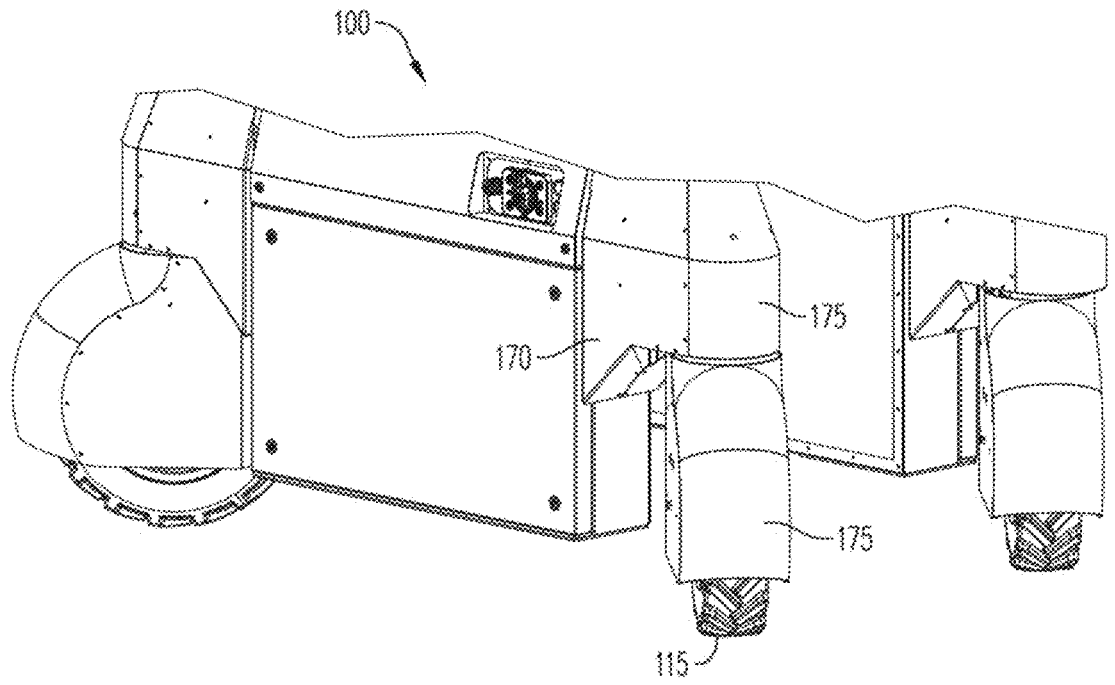
FIG. 16 illustrates a view of a portion of an autonomous vehicle pursuant to some embodiments.

The rotation of a wheel 115 as well as the wheel cover 125 and the bumper 175 are shown in FIG. 16. When a wheel 115 is turned (e.g., to operate the autonomous vehicle 100 through a turn), the wheel 115, the wheel cover 125, and the bumper 175 all turn, while the wheel assembly cover 170 remains fixed. Further, the wheel assembly cover 170 is spaced slightly apart from the bumper 175, allowing the bumper 175 to rotate within the wheel assembly cover 170. At all times during a turn, this configuration reduces the possibility of branches, leaves or limbs of plants being damaged or caught on the autonomous vehicle 100. Further, the bumper 175, the wheel 115 and the wheel cover 125 are able to move independently of the rest of the autonomous vehicle 100 in a vertical direct. For example, when the autonomous vehicle 100 moves across obstacles, the suspension of the autonomous vehicle 100 (shown in FIGS. 7 and 8) allow the bumper 175, the wheel 115 and the wheel cover 125 to move up and down without exposing any gaps or edges that could snag or otherwise damage a plant. In part, this independent movement is achieved by mounting the bumper 175, the wheel 115 and the wheel cover 125 to pivot points (shown as items 815 of FIGS. 7 and 8) that also are attached to the suspension of each wheel assembly.

Figure 7:
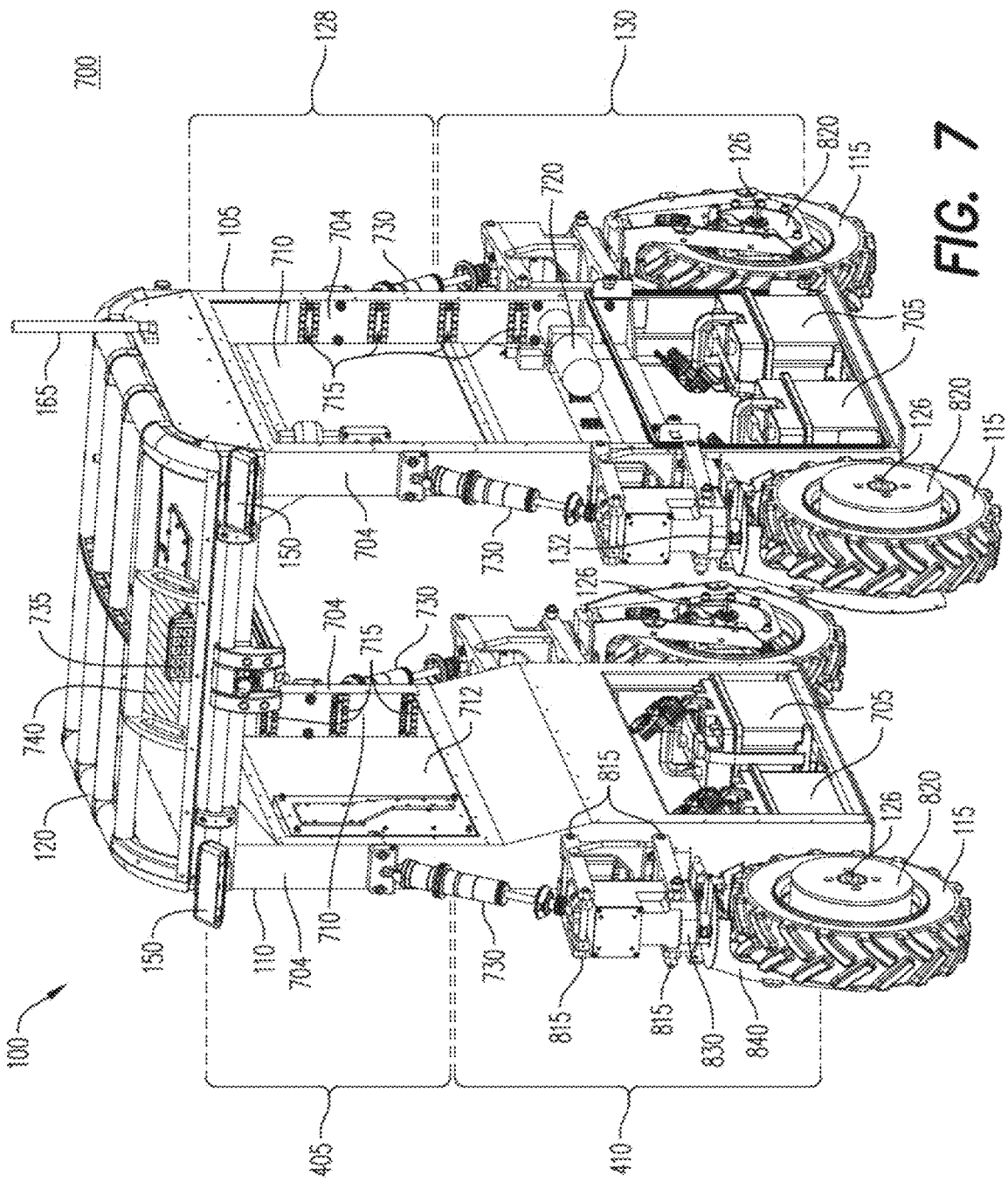
FIG. 7 illustrates a first perspective interior view of autonomous vehicle according to an embodiment.
Figure 8:
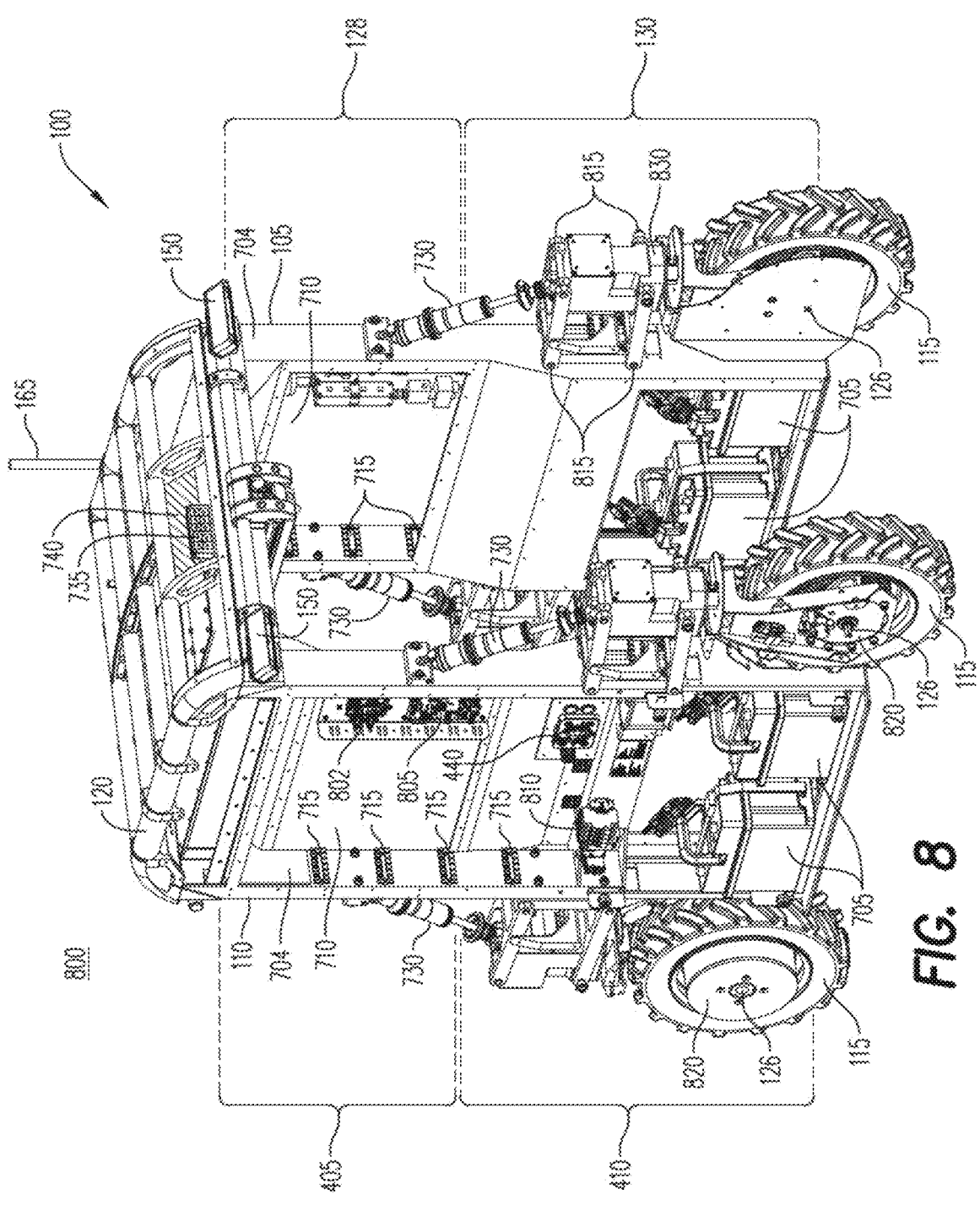
FIG. 8 illustrates a second perspective interior view of autonomous vehicle according to an embodiment.

In some embodiments, each structural wall 105, 110 is formed around a substantially rectangular shaped chassis frame (shown as item 704 of FIGS. 7 and 8). The structural walls 105, 110 have a number of removable panels mounted on the chassis frame which protect electronics and other components that may be mounted within the walls 105, 110 (which will be described further below). In some embodiments, the first structural wall 105 may be comprised of two or more portions, such as a first structural wall upper portion 128 and a first structural wall lower portion 130. Second structural wall 110 may similarly be comprised of two or more portions. First structural wall upper portion 128 may include an upper panel 135 which may be secured to first structural wall 105 by screws, bolts, or any other suitable securing mechanism. Upper panel 135 may include an emergency button 140 or a hole through which emergency button 140 may be accessed. In some embodiments, for example, if the autonomous vehicle 100 experiences a malfunction or other issue, a human worker or operator may manually depress the emergency button 140 to stop movement of autonomous vehicle 100 and/or to power down the autonomous vehicle 100. The autonomous vehicle 100 provides a number of modularity and expansion benefits. In some embodiments, for example, if relatively tall crops are to be analyzed, first structural wall portion 128 may be removed from first structural wall 105 and replaced with a replacement structural wall portion having a larger height. Similarly, second structural wall 110 may be comprised of two or more portions, one of which may be replaced with a replaced portion in order to increase (or decrease) a height of second structural wall 110. For example, portions of first structural wall 105 and second structural wall 110 may be removed and replaced with replacement portions having different heights in other to change a distance between structural top 120 of autonomous vehicle 100 and the bottom of the wheels 115 thereof. Further, each of the panels of the structural walls 105, 110 may be replaced with different panels that are configured to hold different sensors or devices.

Various circuitry may be disposed within first structural wall upper portion 128 and may be protected from environmental elements, for example, by upper panel 135. For example, circuitry for implementing movement of the autonomous vehicle 100, performing computer vision to enable the movement across various terrain and around obstacles, processing images and/or video captured of crops to identify pests and/or diseases may additionally be performed by the circuitry. For example, the circuitry may include one or more processors, such as a Central Processing Unit (CPU), a Vision Processing Unit (VPU), various signal processing devices, one or more memory or storage devices, and various input/output devices (e.g., as shown and described in conjunction with FIG. 14 below).

The first structural wall 105 may include a number of removable panels. For example, a lower panel 145 may be provided which forms a cavity in the first structural wall 105 which houses one or more power sources, such as batteries. Such batteries may power movement and other circuitry of autonomous vehicle 100 (such as shown in FIG. 14). Each of the removable panels on the structural walls 105, 110 (as well as the structural top 120) may be secured by screws, bolts, or any other suitable securing mechanism.

In some embodiments, operation of the autonomous vehicle 100 may be aided by the use of a computer vision system or an embedded LIDAR system able to generate a 3D point cloud of plants and obstacles. For example, a computer vision system may include one or more navigation cameras 150 to capture video or other images of terrain in front of the autonomous vehicle 100 to ensure that the autonomous vehicle 100 is able to traverse from waypoint to waypoint along a predefined path while passing or avoiding driving into obstacles in the path.

A number of different lighting devices, such as light emitting diodes (LEDs) may be disposed on the chassis of the autonomous vehicle 100. For example, a row of LEDs may be disposed on a bottom side of structural top 120 to illuminate portions of a crop disposed below structural top 120. Such illumination may be particularly useful for circumstances when autonomous vehicle 100 is acquiring photos or video at night or when the conditions are otherwise relatively dark so that clearer images and video may be acquired. As will be described below in conjunction with FIG. 5, one or more lighting devices may also be provided in conjunction with one or more cameras to improve the quality of images captured in low light or dark conditions. Each of these lighting devices are powered by power modules of the autonomous vehicle 100 and controlled by a control system of the autonomous vehicle 100 (e.g., as shown in FIG. 14).

When in operation, autonomous vehicle 100 may be operated (such as under control of the autonomous vehicle controller 1408 shown in system 1400 of FIG. 14) travel along an axis 155 as indicated by arrows illustrated along axis 155. The autonomous vehicle 100 may also travel in a reverse direction along axis 155 and the autonomous vehicle controller 1408 shown in FIG. 14 may cause the operation of wheels 105 to change direction by controlling the operation of the drive motors 1436.

The shape of the body or structure of autonomous vehicle 100 is designed to reduce drag from plants or crops being observed. For example, the shape of the body of autonomous vehicle 100 is designed to be sufficiently wide and sufficiently tall to reduce or minimize the occurrences of any portion of autonomous vehicle 100 knocking into portions of plants or crops which may slow movement of the autonomous vehicle 100.

FIG. 2 illustrates an overhead view 202 of an autonomous vehicle 100 operating in an agricultural field 200 according to an embodiment. The field 200 may include one or more rows of crops such as a first row 205, second row 210, third row 215, fourth row 220, fifth row 225, and sixth row 230. Although six rows of crops are shown in FIG. 2, it should be appreciated that any number of rows of crops may be disposed in an agricultural field 200 in which the autonomous vehicle 100 operates. There may be dirt disposed in the space between each row of crops.

The autonomous vehicle 100 may traverse the first row 205 with the wheels 115 of first structural wall 105 disposed on the dirt on one side of the first row 205 and the wheels 115 of second structural wall 110 disposed on the dirt on the other side of the first row 205. As the autonomous vehicle 100 traverses a row, the crops of the first row 105 are disposed on the space formed between first structural wall 105, second structural wall 110, and below an underside surface of structural top 120. As discussed above, the mission plan being executed by the autonomous vehicle 100 may cause the autonomous vehicle 100 to travel a certain distance along first row 205 and to periodically perform one or more detection tasks (e.g., such as operating one or more cameras to capture one or more images at different way-points to detect a presence of disease and/or pests).

In some embodiments, the autonomous vehicle 100 may be transported to agricultural field 200 via a communications vehicle 240 (also referred to as a base station). For example, the communications vehicle 240 may be driven to the end of agricultural field 200 with the autonomous vehicle 100 in the back or trunk of communications vehicle 240. The autonomous vehicle 100 may drive down a ramp out of the back of communications vehicle 240 or may otherwise be wheeled down the ramp. The communications vehicle 240 may wirelessly communicate with one or more autonomous vehicles 100. For example, the communications vehicle 240 may transmit one or more messages with a mission plan or other instructions defining one or more paths for the autonomous vehicle 100 to travel. The mission plan or other instructions may also define the waypoints at which one or more detection tasks are to be performed (e.g., such as the locations at which one or more cameras are to be operated to capture one or more images). In some embodiments, the mission plan or other instructions may also define waypoints at which other sensors of the autonomous vehicle 100 are to acquire other types of samples, such as soil samples, crop leaf samples, or inspect samples via use of automated insect traps that can detect and classify insect species, as discussed in more detail below with respect to FIG. 7. In some embodiments, during the execution of a mission plan, autonomous vehicle 100 may similarly communicate with communications vehicle 240 if it gets stuck, tips over, is running low on battery power, or experiences any other type of malfunction, for example. In some embodiments, the communications vehicle 240 acts as a mobile base station and is deployed in or near an agricultural field to support one or more autonomous vehicles 100 in the execution of one or more mission plans associated with the field. The communications vehicle 240 may also be equipped with equipment to support the operation of the autonomous vehicles 100 (e.g., such as spare batteries, tires, maintenance tools and equipment, etc.).

Figure 3:
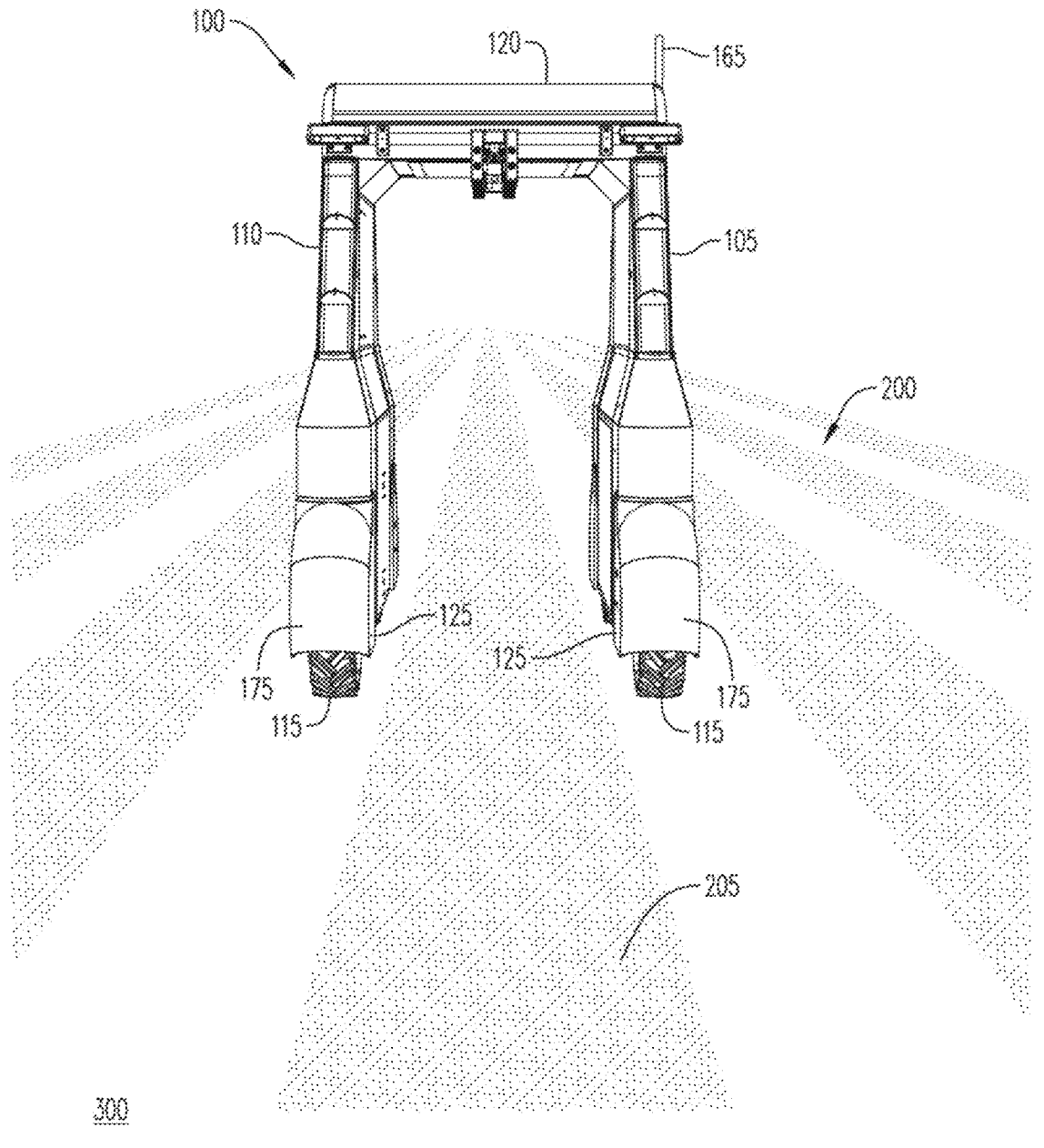
FIG. 3 illustrates a front view of autonomous vehicle in an agricultural field according to an embodiment.

FIG. 3 illustrates a front view 300 of the autonomous vehicle 100 in an agricultural field 200 according to an embodiment. FIG. 3 illustrates how the wheels 115 of the first structural wall 105 and the wheels 115 of the second structural wall 110 of autonomous vehicle 100 are positioned on opposite sides of a first row 205 of crops during operation.

Referring back to FIG. 1, the autonomous vehicle 100 may include one or more cameras, such as camera 510 to capture images of crops. Although only one camera 510 is shown in FIG. 1, any number of cameras may be included, such as those shown in the embodiment illustrated in FIG. 5.

The autonomous vehicle 100 may include an antenna 165 to enable communication between the autonomous vehicle 100 and a server or other electronic devices of communication vehicle 240 or other control system (e.g., such as control system 1480 of FIG. 14). For example, the autonomous vehicle 100 may receive a mission plan or other instructions via one or more messages received through use of antenna 165. Similarly, the autonomous vehicle 100 may transmit the results of a detection task to a control system while the autonomous vehicle 100 is traversing a field or executing a mission plan. For example, the autonomous vehicle 100 may perform actions to capture images, analyze the images and transmit results to a control system via an antenna 165 substantially in real time as the autonomous vehicle 100 traverses a field. Information such as locations of disease and/or pests and, in some implementations, the type of disease and/or pests detected as well as the density or amount of the disease and/or pests detected may be transmitted as well as images associated with each detection.

Figure 4:
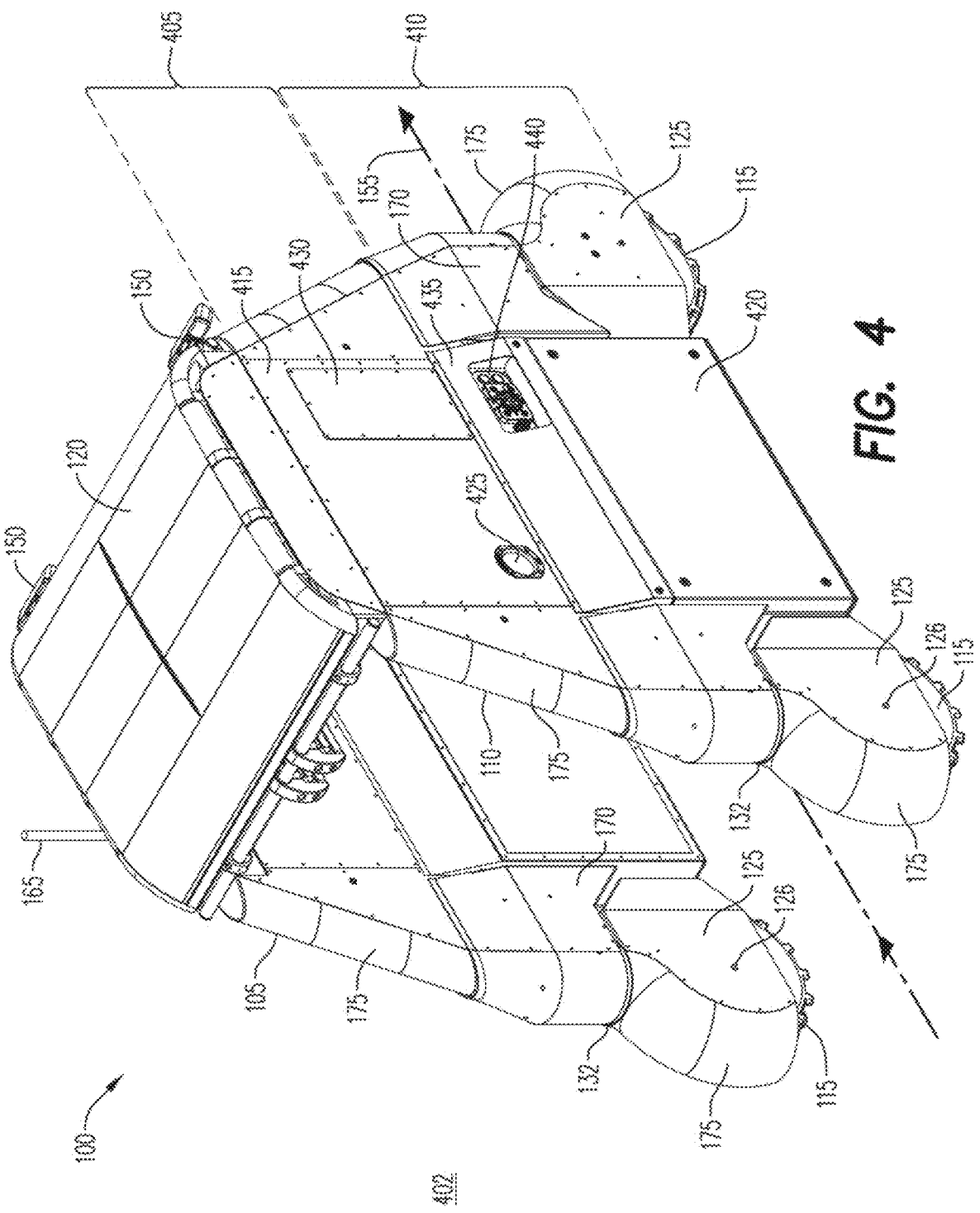
FIG. 4 is a second elevated perspective view of an autonomous vehicle according to an embodiment.

FIG. 4 is a second perspective view 402 of an autonomous vehicle 100 according to an embodiment. For example, FIG. 4 illustrates an obverse view of autonomous vehicle 100 relative to the first perspective view shown in FIG. 1. For example, in the second perspective view 402 shown in FIG. 4, the second structural wall 110 is in front of the first structural wall 105, whereas in the first perspective view shown in FIG. 1, the first structural wall 105 is shown in front of the second structural wall 110. In some embodiments, the interior facing surface of one of the structural walls 105, 110 is colored and formed to provide a contrasting surface for images captured by cameras mounted on an interior facing surface of the other of the structural walls 105, 110. For example, in FIG. 4, the interior facing surface of the structural wall 105 does not have cameras mounted thereon and is provided with a contrasting surface for images taken by cameras mounted on the interior facing surface of the structural wall 110. In some embodiments, either or both of the structural walls 105, 110 may have interior facing cameras mounted thereon to capture images for processing pursuant to the present invention.

In some embodiments, the second structural wall 110 may be comprised of two or more portions, such as a second structural wall upper portion 405 and a second structural wall lower portion 410. The second structural wall upper portion 405 may include a removable upper panel 415 which may be secured to the second structural wall 110 by screws, bolts, or any other suitable securing mechanism. The upper panel 415 may include an emergency button 425 or a hole through which the emergency button 425 may be accessed. The emergency button 425 of the upper panel 415 may be the same as or similar to the emergency button 140 of the upper portion 128 of the first structural wall 105 as shown in FIG. 1. If the autonomous vehicle 100 experiences a malfunction, for example, a human worker or operator may manually depress the emergency button 425 to stop movement of the autonomous vehicle 100 and/or to power down the autonomous vehicle 100 in some implementations. Various circuitry may be disposed within the first structural wall upper portion 405 and may be protected from environmental elements, for example, by the upper panel 415. For example, circuitry for implementing movement of the autonomous vehicle 100, performing computer vision to enable the movement across various terrain and around obstacles, processing images and/or video captured of crops to identify pests and/or diseases may additionally be performed by the circuitry. As an example, one of the walls 105, 110 may contain an MCU, VCU and other control electronics (as shown in FIG. 14), while the other of the walls 105, 110 may contain a hydraulic system (as shown in FIG. 7 as item 720). Both walls may have power distribution systems and network connections.

The upper panel 415 may include a removable subpanel 430 and one or more additional subpanels in various implementations. The subpanel 430 may be secured to the upper panel 415 via use of screw, bolts, or any other suitable fastening mechanism. The subpanel 430 may be removed and reattached to, for example, replace a circuit board, processor, or some other item of circuitry.

The second structural wall 110 may include one or more removable panels of its own, such as a first lower panel 420 and a second lower panel 435. One or more power sources, such as batteries may be disposed in a cavity behind the first lower panel 420. Such batteries may at least partially power movement and other circuitry of the autonomous vehicle 100. The second lower panel 435 may include a power switch 440. The power switch 440 may be used to manually turn on or off power to the autonomous vehicle 100, for example. The first lower panel 420 and the second lower panel 435 may each be secured to the second structural wall lower portion 410 of the second structural wall 110 by screw, bolts, or any other suitable securing mechanism, for example.

As discussed above with respect to FIG. 1, the embodiment shown in FIG. 4 illustrates axis 155. When in operation, the autonomous vehicle 100 may travel along an axis 155 as indicated by arrows illustrated along axis 155. The autonomous vehicle 100 may also travel in a reverse direction along axis 155 and may turn wheels 115 to change direction, for example.

Figure 5:
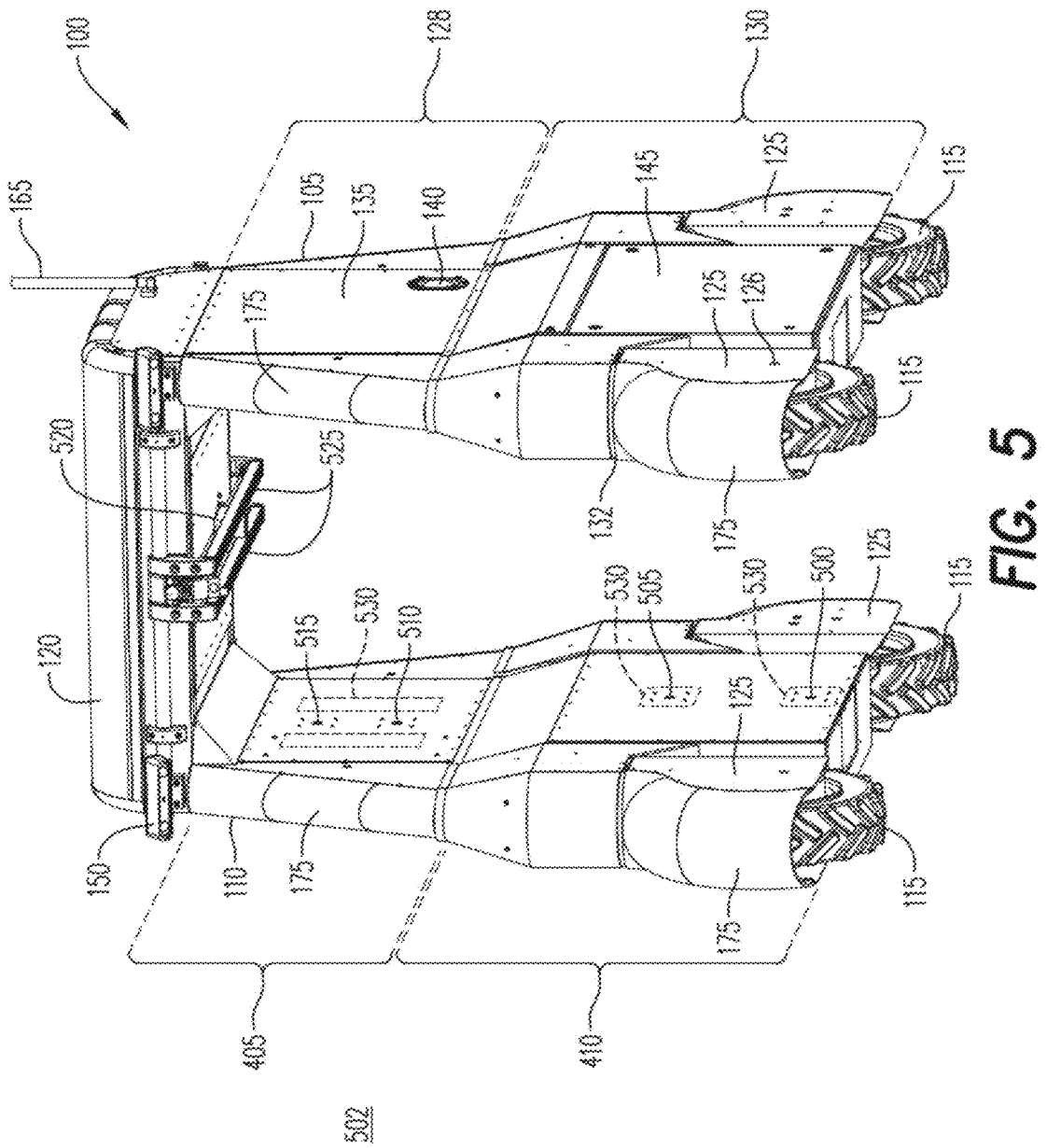
FIG. 5 is a perspective view of an autonomous vehicle according to an embodiment.

FIG. 5 is a perspective view 502 of the autonomous vehicle 100 according to an embodiment. FIG. 5 illustrates various details of the autonomous vehicle 100 which are not visible in first elevated perspective view 102 or the second elevated perspective view 402 of the autonomous vehicle 100. For example, the perspective view 502 shows various cameras for capturing or capturing images for use in one or more detecting tasks (e.g., such as capturing images to detect the presence of disease and/or pests). For example, a first camera 500, a second camera 505, a third camera 510, and a fourth camera 515 may be disposed at various locations along second structural wall 110. While four cameras are shown in FIG. 5, any number of cameras or imaging devices may be provided. Each of these cameras may be positioned to capture images of portions of a crop disposed in a space between the first structural wall 105 and the second structural wall 110 at a predefined or predetermined location or time, such as when autonomous vehicle 100 has stopped at a waypoint in accordance with a predefined path as defined by a mission plan. Several cameras located at different heights may be employed, for example, because certain diseases and/or pests may only be visible or may be more easily detected if photos or video is taken from a certain height, for example.

For example, as shown in perspective view 502, the autonomous vehicle 100 may also include a top camera 520 disposed on an underside of the structural top 120. The top camera 520 may be positioned to face approximately directly down in a direction orthogonal to a plane formed by an underside of the structural top 120. By using top the camera 520 in such a location, images may be acquired of a top portion of a crop as the autonomous vehicle 100 is positioning in a row of crops with underside of the top portion 120 being directly above the top of such a crop.

Although only five cameras are shown in perspective view, it should be appreciated that in some implementations, more or fewer than five cameras may be employed. Moreover, an underside of the structural top 120 may employ more than one top camera 520 in some implementations. Moreover, although four cameras are shown on second structural wall 110 in the perspective view 502, it should be appreciated that in some implementations, one or more cameras may be disposed on the first structural wall 105 instead of on the second structural wall 110, or in addition to the cameras shown on the second structural wall 110.

The perspective view 502 shows two light panels 525. Each light panel 525 may be coupled to an underside of the structural top 120. For example, each light panel 525 may include one or more LEDs to illuminate a crop and/or an area around the crop to provide an additional level of illumination which may be beneficial for acquiring useful images or video from the various cameras disposed on autonomous vehicle 100. Although two light panels 525 are shown approximately along a center line of an underside of structural top 120, it should be appreciated that in some implementations, a single light panel 525 or more than two light panels 525 may be disposed in different locations. Moreover, in some implementations, one or more additional light panels may be employed, such as an additional light panel disposed on the first structural wall 105 and/or on the second structural wall 110. As shown by the dotted lines 530, different light panels 530 may be positioned proximate one or more cameras. These light panels 530 may be configured and positioned to illuminate an area at which each camera is focused. In some embodiments, a light panel 530 may be formed as one or more square or rectangular LED light panels positioned proximate one or more cameras (such as the light panels 530 shown proximate cameras 515, 510). In some embodiments a light panel 530 may be formed as a circular or ring-shaped LED light panel (e.g., such as the light panels 530 shown proximate cameras 500, 505). Other shapes and configurations of light panels may be provided to increase the quality of images captured by the cameras. Further, the light intensity and wavelengths of each light panel 530 may be selected based on the nature of each camera. In this manner, embodiments allow the autonomous vehicle 100 to operate and perform detection tasks in a wide range of lighting conditions (including at night).

Different types of cameras may be employed within a body of autonomous vehicle 100. For example, the cameras may be capable of capturing Red Green Blue color model (RGB) photographs and/or video. However, in some implementations, one or more of the cameras may be capable of capturing images other than RGB images and/or video, such as near-infrared (NIR), Red Edge, and/or thermal images, to name just a few examples among many. In some implementations, a single camera may be capable of capturing RGB, NIR, Red Edge, or thermal images. However, in other implementations, an RGB camera may be removed from the body of the autonomous vehicle 100 and replaced with a different type of camera, such as an NIR camera. In some embodiments, LIDAR cameras and sensors may be provided for the detection of plant morphology attributes. In some embodiments, hyperspectral cameras may also be provided for other detection tasks. The ability to replace such cameras as desired provides a modularity or customizability benefit to autonomous vehicle 100, for example.

Figure 6:
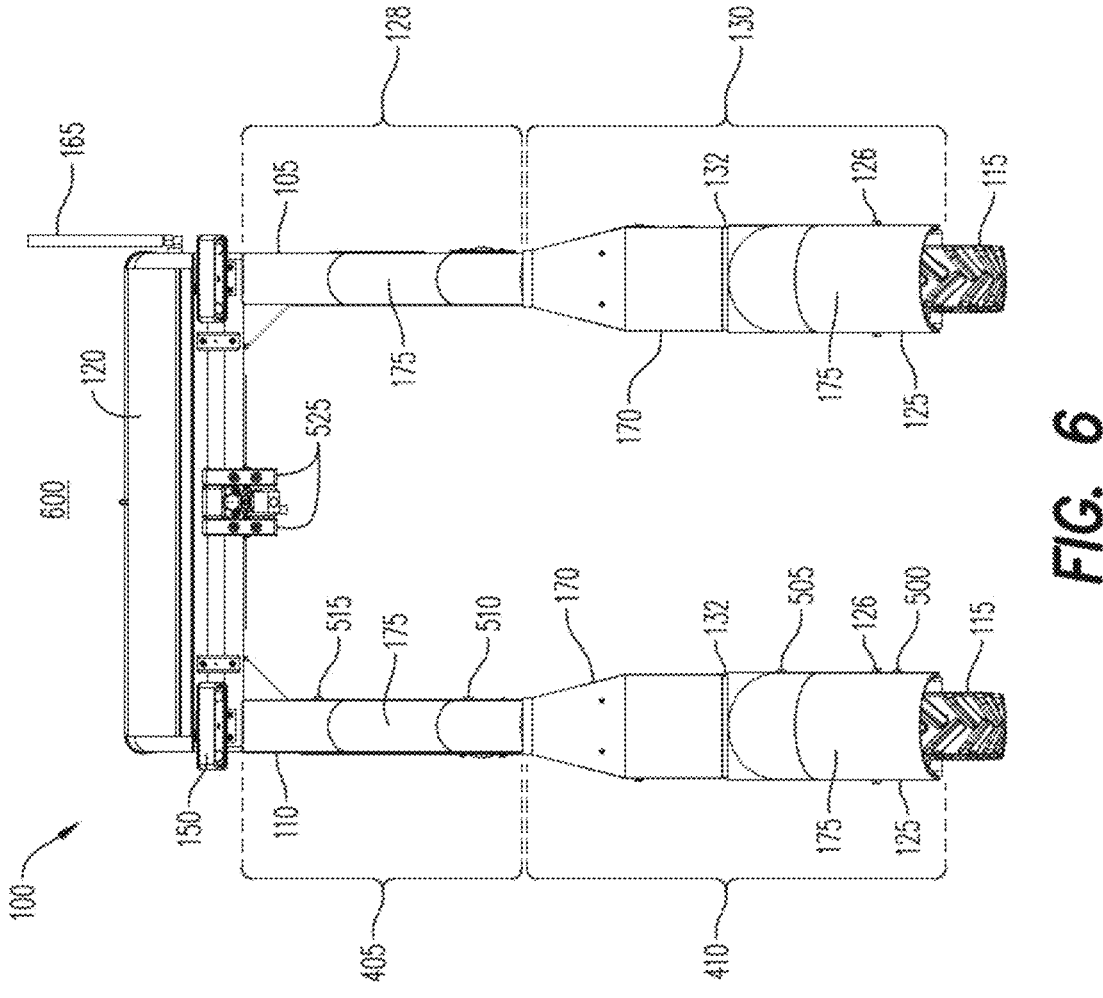
FIG. 6 illustrates a front view of autonomous vehicle according to an embodiment.

FIG. 6 illustrates a front view 600 of autonomous vehicle 100 according to an embodiment. As illustrated in the front view 600, two light panels 525 may be disposed approximately along opposite sides of a midline of the underside of the structural top 120 in accordance with an embodiment. Further, the front view 600 illustrates the shape of each structural wall 105, 110. As shown the lower portion 130 is wider than the upper portion 128. This allows the autonomous vehicle 100 to operate without damaging larger crops, as plants are typically wider at their tops. In some embodiments, the lower portion 130 of each structural wall 105, 110 is approximately 20 cm wide and the upper portion 128 is approximately 10 cm wide (although different widths may be used). This relatively narrow structure allows the autonomous vehicle 100 to easily traverse rows in a causing minimal or substantially no damage to the crops.

FIG. 7 illustrates a first perspective interior view 700 of autonomous vehicle 100 according to an embodiment. The view 700 is similar to the first elevated perspective view 102 shown in FIG. 1, but with the removal of various external panels, a top surface of structural top 120, and wheel coverings 125, for example. As depicted in the view 700, various cavities may be disposed within the structural top 120, the first structural wall 105, and the second structural wall 110. The structural integrity of each structural wall 105, 110 is provided by a generally rectangular chassis frame 704. The removable external panels are mounted on the rectangular chassis frame 704, and control systems and other electronics are mounted within the rectangular chassis frame 704. The view 700 shows one or more batteries 705 disposed behind panels on each of the first structural wall 105 and the second structural wall 110 within the rectangular chassis frame 704. The batteries 705 are sized to hold enough charge to power movement of the autonomous vehicle 100 as well as to operate the electrical components and detection equipment mounted on the autonomous vehicle 100. For example, each battery 705 may comprise a 12 volt, 100 Ah battery, such as a lithium battery. During operation, panels of the first structural wall 105 and the second structural wall 110 may be removed from the rectangular chassis frame 704 to replace the batteries 705 stored in cavities therein. For example, during operation, the batteries 705 of the autonomous vehicle 100 may be periodically replaced with fully charged batteries as prescribed or needed. A human operator may manually remove and replace used the batteries 705 with fully charged batteries in a particular implementation. Pursuant to some embodiments, the autonomous vehicle 100 may be configured to automatically perform processing to replace a depleted or otherwise unusable battery 705. For example, in some embodiments, the autonomous vehicle 100 may automatically navigate itself to a battery replacement location which then is operated to replace one or more batteries 705.

The first structural wall 105 may include one or more cavities 710 in which various circuitry, such as circuit boards, processors, storage devices, sirens, or other components of circuitry may be disposed. The rectangular chassis frame 704 may carry wiring to one or more ports 715 to which cables or connectors of one or more components of circuitry may be connected. The wiring may deliver control signals, data and power to electronics connected to the ports 715 and mounted within the rectangular chassis frame. Certain components, such as a greenhouse gas sensors or soil chemistry sensors or soil physics sensors or detectors may be integrated with the autonomous vehicle robot 100 by being connected to the one or more ports 715. Such sensors or devices connected to any of the ports 715 may be compatible with a software platform employed by autonomous robot system 100, for example.

The autonomous vehicle 100 may comprise a fully electric vehicle which does not require use of a combustion engine, for example. One or more electric drive motor or steering motors may be provided. In some embodiments, each wheel 115 is associated with a drive motor 820 and a steering motor 830 that controls the operation and movement of the wheel 115. Each drive motor 820 and steering motor 830 may be coupled to the rectangular chassis frame 704 at a number of pivot points 815 which allow the components to pivot with respect to the rectangular chassis frame 704 (e.g., such as when a wheel traverses a bump or other obstacle). The components are also coupled to the rectangular chassis frame 704 via a shock absorber 730 or other suspension system. Power and control signals are transmitted to the drive motor 820 and steering motor 830 via wiring routed through the rectangular chassis frame 704. The drive system associated with each wheel 115 (including the drive motor 820, steering motor 830, fork 840, pivot points 815 and shock absorber 830) are concealed by the wheel assembly cover 170 and bumper 175 (not shown in FIG. 7).

Each wheel 115 may be powered by an electric drive motor 820 and a steering motor 830. The electric drive motor 820 may impart a force to cause a particular wheel 115 to advance forward or backward, and/or accelerate. The steering motor 830 may impart a force to change a direction (e.g., in a clockwise or in a counterclockwise direction) on movement of the wheel 115, for example. A brake (not shown in FIG. 7) may slow or stop movement of the wheel 115. In some embodiments, the autonomous vehicle 100 may utilize regenerative breaking to charge one or more batteries 705 while decelerating the vehicle. Because an autonomous vehicle 100 may perform multiple such decelerations while executing a mission plan, such regenerative breaking can result in significant improvements to the range of a vehicle. Shock absorbers 730 may form a portion of a suspension system and may absorb shocks from uneven terrain, for example, as wheels 115 are in motion.

In some embodiments, a cavity 740 within the structural top 120 may include a UV light emitter 735 to attract insects. Insects attracted to the UV light emitted by the emitter 735 may be electrically zapped when they come in contact with or come into close proximity to the UV light and remain in cavity 740 for subsequent analysis. For example, the number and type of insects may be counted and categorized by the autonomous vehicle 100 or by a human operator at periodic intervals. In some embodiments, other sensors or devices, such as a pherome emitter may be provided which emits one or more pheromes to attract insects. For example, the pheromone emitter may release pheromones and insects may fly into an opening of the structural top 120 to get close to the pheromone emitter. A sticky trap may be disposed adjacent to the pheromone emitter to trap any insects which come in contact with a surface of the sticky trap. For example, the number and the type of insects which are trapped within the sticky trap may be counted and categorized by the autonomous vehicle 100 or by a human operator at periodic intervals. For example, a human operator may periodically remove and replace a used sticky trap and may count and categorize the insects trapped on the removed sticky trap. In some embodiments, a soil sampling module may be included in a cavity located adjacent to one of the batteries 705 illustrated in the first perspective interior view 700. For example, such a soil sampling module may include a hole which may open on a side of a panel or from a bottom of the panel. In some embodiments, a robotic arm may extend down into the soil below the soil sampling module to acquire a sample of soil. For example, such a robotic arm may extend down one or two inches into the soil to scoop out or otherwise extract a relatively small sample of soil for analysis. The robotic arm may subsequently retract into the soil sampling module and analyze the physical and chemical characteristics of the soil to determine whether there is a lack of certain macro and micro nutrients in the soil and/or a presence of certain bacteria, fungi, nematoids and viruses which adversely affect plant growth or contribute to it and/or measure the soil carbon sequestered in the soil and the greenhouse gas ("GHG") emissions of the soil. In one example, the soil sampling module may include sensors to perform such analysis directly. Alternatively, the soil samples may be collected and the soil may subsequently be extracted and analysis may be performed after the soil samples have been removed from the soil sampling module. In some embodiments, one or more leaves may similarly be extracted from a crop via use of a robotic arm for analysis.

FIG. 8 illustrates a second perspective interior view 800 of the autonomous vehicle 100 according to an embodiment. For example, second perspective interior view 800 of FIG. 8 illustrates an obverse view of the autonomous vehicle 100 relative to the first perspective view 700 shown in FIG. 7. For example, in the second perspective view 402 shown in FIG. 4, the second structural wall 110 is in front of the first structural wall 105, whereas in the first perspective view 102 shown in FIG. 1, the first structural wall 105 is shown in front of the second structural wall 110. The second perspective view 800 is similar to the second perspective view 402 shown in FIG. 4, but with the removal of various external panels, a top surface of structural top 120, and the wheel coverings 125, for example.

The second perspective view 800 shows certain details not visible in the first perspective view 700 of FIG. 7. For example, the second perspective view 800 shows a power switch 440, which may be used to manually turn on or off power to autonomous vehicle 100, for example. The power switch 440 may be associated with the emergency button 140 of FIG. 1. The second perspective view 800 also shows a first circuit board 802 and a second circuit board 805. Each of first circuit board 802 and second circuit board 805 may include various circuitry components, such as processors for controlling the computer vision features of the autonomous vehicle 100, analyzing photographs and/or video captured from any of the cameras embedded within a body of the autonomous vehicle 100 to detect diseases and/or pests, and/or generating messages to transmit to a server or other device to indicate areas of interest to spray with chemicals such as pesticides and/or biopesticides, for example. Second perspective view also includes one or more relays 810 which are operable to cut the main battery power when necessary.

Figure 9:
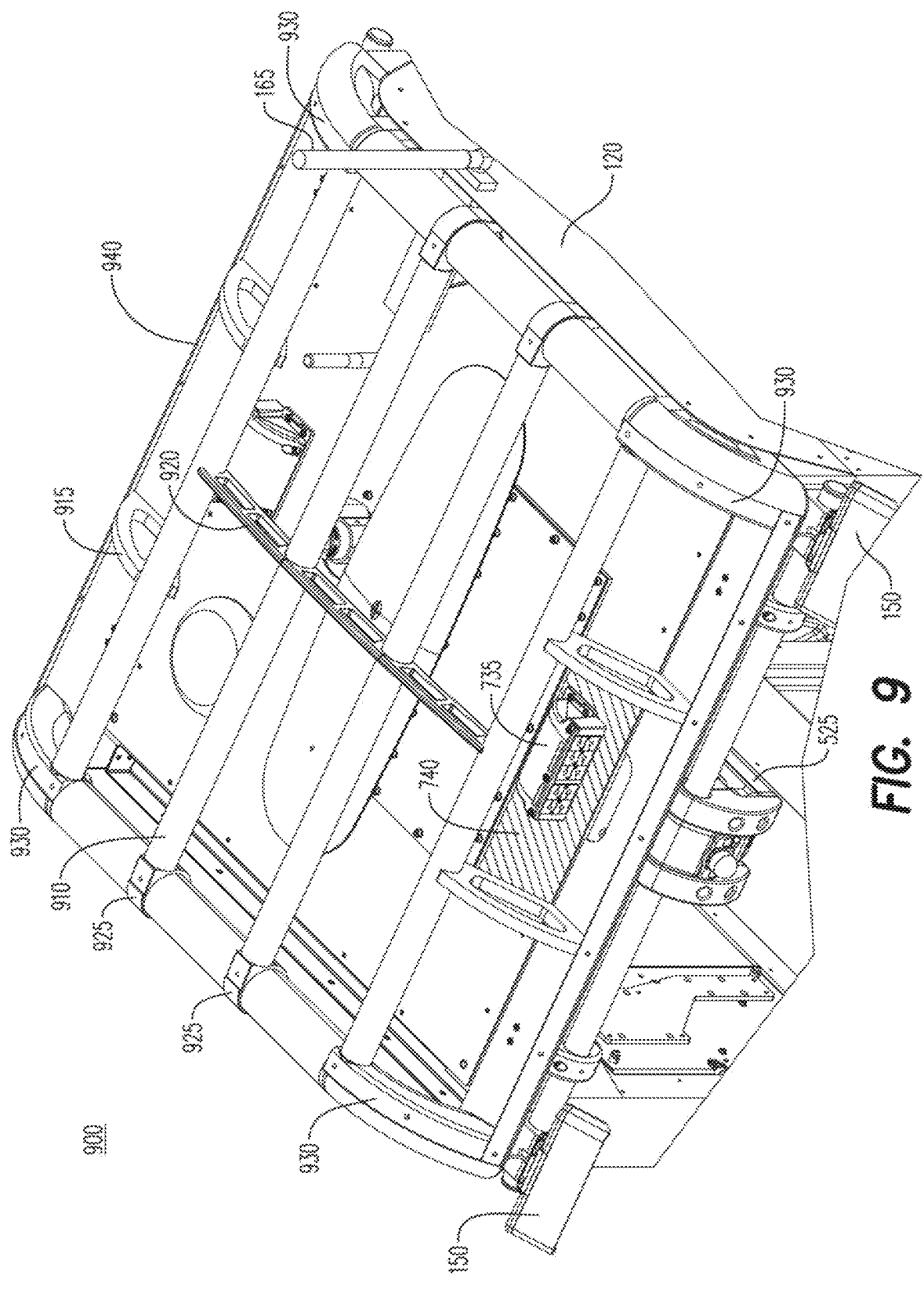
FIG. 9 illustrates a top view of structural top according to an embodiment.

FIG. 9 illustrates a top view 900 of the structural top 120 according to an embodiment. The structural top 120 may include various components which provide a rigid or sturdy support to the structural top 120. For example, one or more frame bars 905 may be disposed on outer ends of the structural top, with one frame bar 905 disposed above first structural wall 105 and an opposing frame bar 905 disposed over the second structural wall 110. Several expansion bars 910 may be disposed between the frame bars 905. For example, the expansion bars 910 may be positioned orthogonal or perpendicular to an axis along which the frame bars 905 extend and the expansion bars 910 may be coupled to the frame bars 905 by either connectors 925 or support beams 930. In some embodiments, the expansion bars 910 may be expandable. For example, a distance between first structural wall 105 and second structural wall 110 may be adjusted by increasing or decreasing the width of structural top 120. In order to change the width of structural top 120, each expansion bar 910 may be expanded or contracted In some embodiments, the width of the structural top 120 may be modified by detaching the structural top 120 from fasteners mounting the structural top 120 to the walls and reattaching the structural top 120 at fastening locations that are a desired width apart. This allows the width of the autonomous vehicle 100 to be narrower or wider to accommodate different crop row widths or different crop and tree/shrub sizes.

Structural top 120 may also include end support beams 915, which couple a front end 935 of structural top to an expansion bar 910, or a back end 940 of the structural top 120 to an expansion bar 910, for example. A central support beam 920 may also be included which extends between approximate center points of expansion bars 910 to provide additional structural stability in accordance with an embodiment. The structural top 120 may also include cable routing paths that route network or power cables from one structural wall to the other and which electrically connects the antenna 165 to other components of the autonomous vehicle 100.

Figure 10:
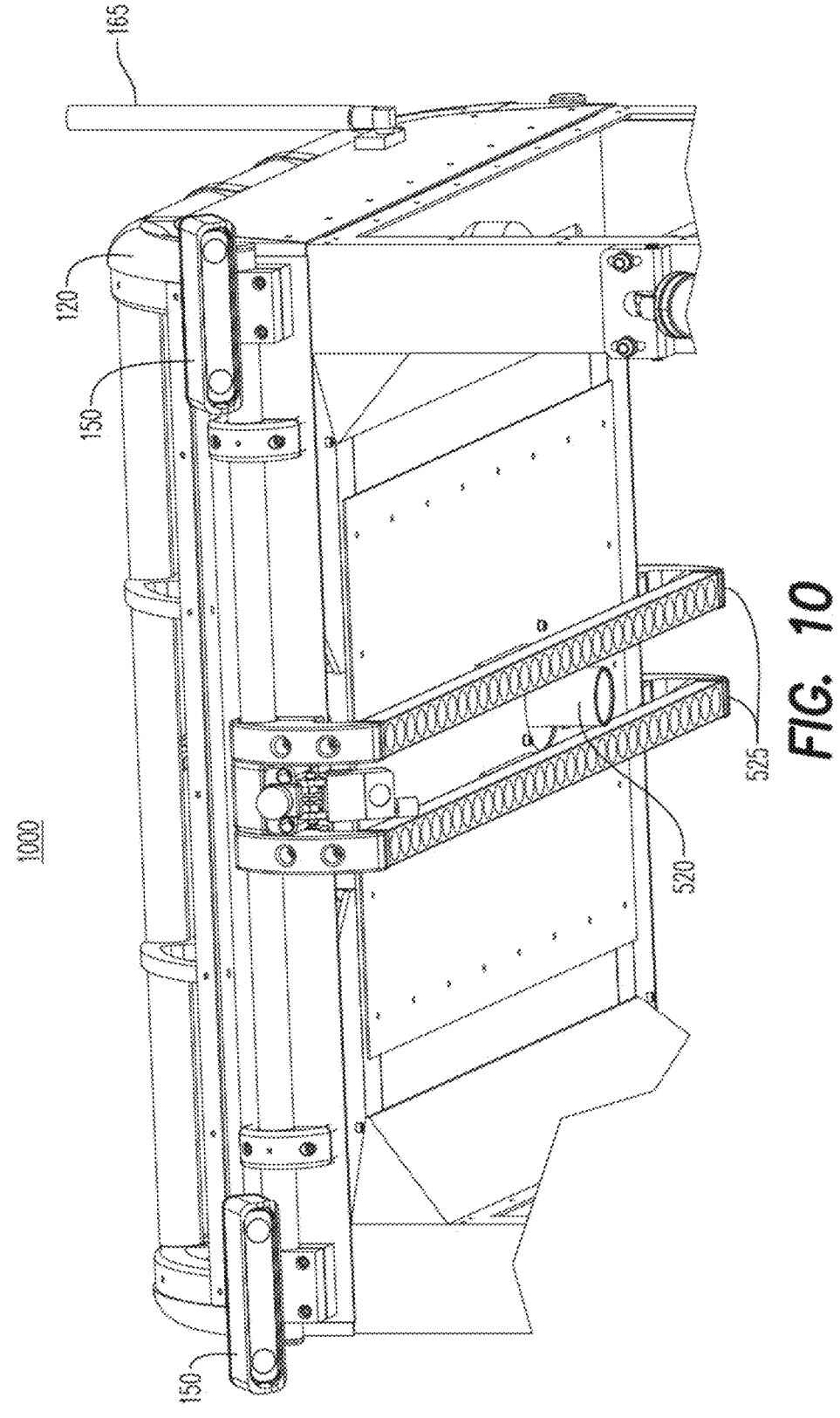
FIG. 10 illustrates a perspective view of the underside of structural top according to an embodiment.

FIG. 10 illustrates a perspective view 1000 of the underside of the structural top 120 according to an embodiment. As illustrated, two light panels 525 may be disposed on an underside of the structural top 120. For example, each light panel 525 may include a plurality of lighting elements, such as LEDs, and may extend between the front end 935 and the back end 940 of the structural top 120. As discussed previously above, light emitted by the light panels 525 may illuminate a portion of a crop under observation or an area around or near the crop.

Figure 11:
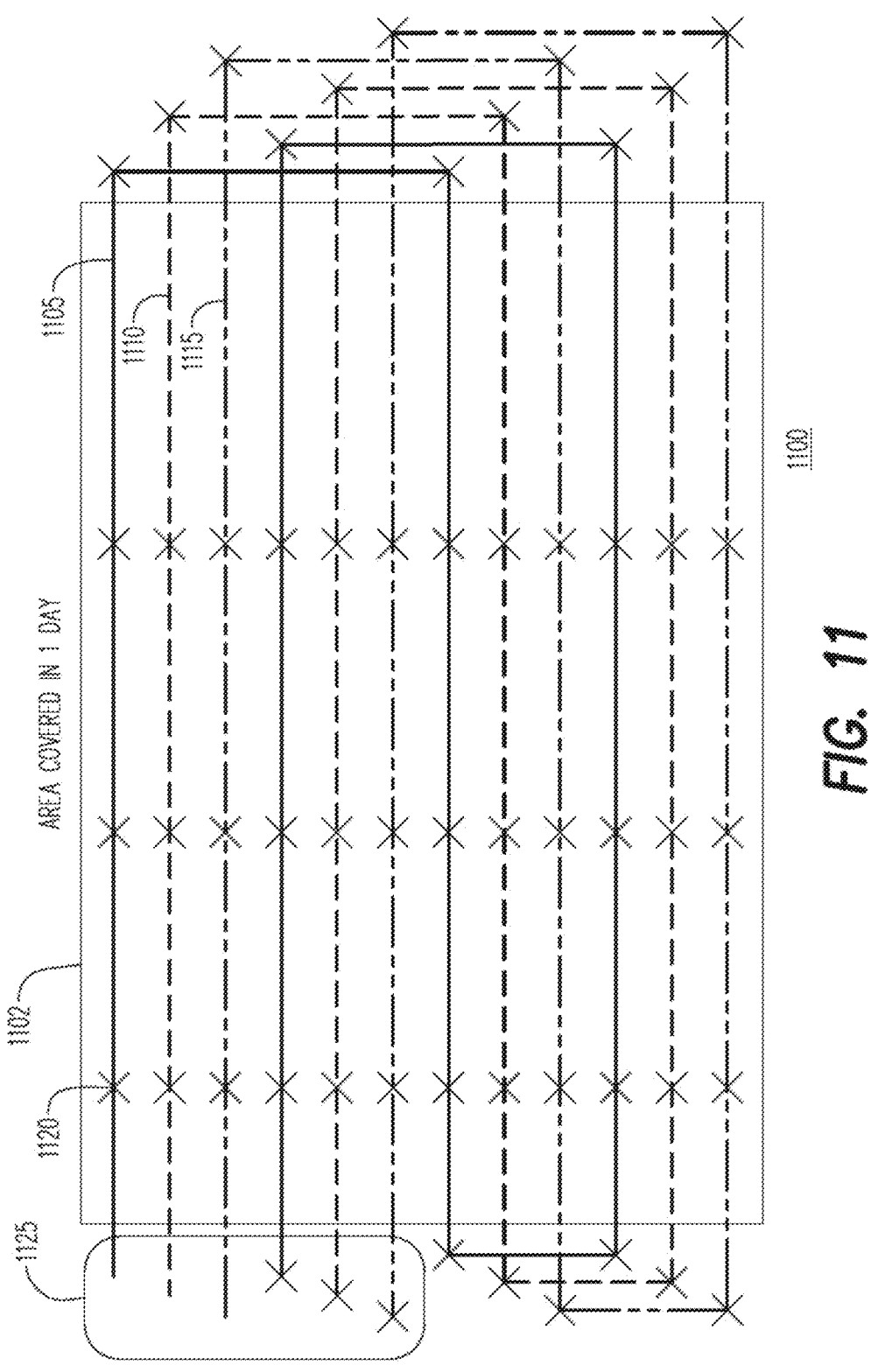
FIG. 11 illustrates a map showing a mission plan with three distinct passes to control an autonomous vehicle to travel along while acquiring photographs, video, and or soil or plant leaf samples or insect samples according to an embodiment.

FIG. 11 illustrates a map 1100 showing a visual representation of a mission plan with three distinct passes to control an autonomous vehicle 100 to travel along while performing one or more detection tasks pursuant to the present invention (e.g., such as acquiring images, taking soil samples or capturing insect samples, etc.). The map 1110 shows a first pass 1105, a second pass 1110, and a third pass 115 for the autonomous vehicle 100 to travel through rows of crops of an agricultural field 1102. Each pass includes various waypoints 1120, each of which is denoted with an "x" in the map 1100. During each pass, the autonomous vehicle 100 is operated to travel from waypoint 1120 to waypoint 1120. At some of the waypoints 1120, the autonomous vehicle 100 is operated to perform one or more detection tasks. For example, the autonomous vehicle 100 may be operated to stop or slow down, acquire images from each of the cameras, such as first camera 500, second camera 505, third camera 510, fourth camera 515, and top camera 520, such as is shown in perspective view 502 of FIG. 5. Video may also be acquired from one or more of the cameras. In some implementations, a light emitter 735 may be operated to emit attractive light wavelengths to attract insects which may be captured via use of a trap 740, such as is shown in the view 700 of autonomous vehicle 100 depicted in FIG. 7.

The mission plan may define one or more waypoints 1120 at which the autonomous vehicle 100 is to change directions, such as to make a 90 degree turn to the left or to the right, for example. The mission plan may further define one or more waypoints 1120 at which the autonomous vehicle 100 is to continue travelling straight forward in the same direction, for example.

The map 1100 indicates three different passes. For a relatively large field, it may take several hours for the autonomous vehicle 100 to complete a pass, such as first pass 1105. After completing first pass 1105, autonomous vehicle 100 may proceed to a battery swapping area 1125, where batteries 705 within the first structural wall 105 and/or the second structural wall 110 may be removed and replaced with fully charged or fresh batteries 705. In some embodiments, such a battery replacement or swapping operation may be performed by a human operator within the span of a few minutes. For example, a panel behind which batteries 705 are disposed may be removed, such as by unscrewing screws, bolts, or otherwise unfastening a fastening mechanism. After removing such a fastening mechanism, the batteries 705 may be accessed and physically removed and replaced. In accordance with an implementation, a communication vehicle 240 such as shown in FIG. 2 may be positioned in a battery swapping area 1125 and a human operator inside the communication vehicle 240 may perform the battery 705 removal and replacement. After replacing one or more batteries 705, the batteries may be placed in a battery charging mechanism if they are rechargeable batteries, so that they are fully charged for subsequent use, for example. As discussed above, in some embodiments, the autonomous vehicle 100 may automatically navigate to a battery swap location if the vehicle detects that one or more batteries require replacement. In some embodiments, a battery swap location may be configured to automatically replace one or more batteries 705.

By performing multiple passes as shown in map 1102, a relatively dense plot of information captured by the detection tasks may be produced. For example, information from a number of passes by the autonomous vehicle 100 (or from multiple autonomous vehicles 100) may be aggregated and used to generate a "heat map" or plot depicting areas of a field where problems have been detected. For example, a plot or heat map of problem areas where crops are affected by pests and/or disease may be identified and used to determine where to spray pesticides or other chemicals to address pest and/or disease issues. The map 1100 is a visual representation of a mission plan that may be delivered to an autonomous vehicle 100 for execution. In practical application, the actual mission plan that is delivered to an autonomous vehicle 100 will include plain text or other instructions which, when processed by processing devices of the autonomous vehicle 100, will cause the operation of the autonomous vehicle 100 to follow the mission plan and execute any detection tasks specified therein. In some embodiments, a control system such as the control system 1480 of FIG. 14 may cause the generation of one or more additional mission plans to be delivered to one or more autonomous vehicles 100 for execution of tasks to remediate or respond to issues detected by the performance of other mission plans. For example, an autonomous vehicle 100 may be configured to perform pesticide applications. That vehicle may receive a mission plan that is configured with waypoints and other information that causes the vehicle to apply pesticides to locations detected by other vehicles.

Figure 12A:
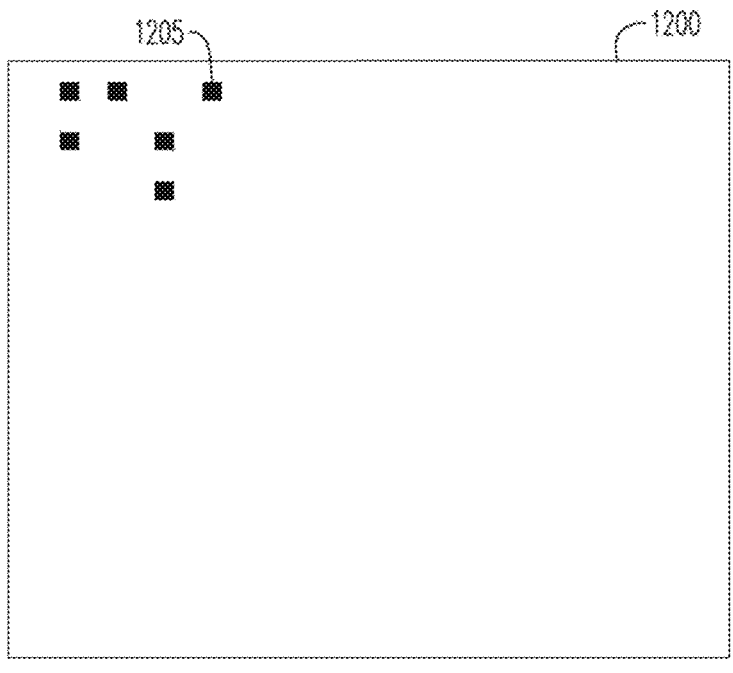
FIG. 12A illustrates a plot of an agricultural area having detected locations of concern according to an embodiment.

FIG. 12A illustrates a plot 1200 of an agricultural area having detected locations of concern 1205 according to an embodiment. For example, the plot 1200 may have a shape representative of an agricultural area being monitored. If a location having pests and/or disease is identified, such as from images acquired by cameras on the autonomous vehicle 100, a square may be positioned on the plot 1200 which indicates a location of concern 1205. Plot 1200 indicates that there are six different locations of concern 1205 in the agricultural field.

Figure 12B:
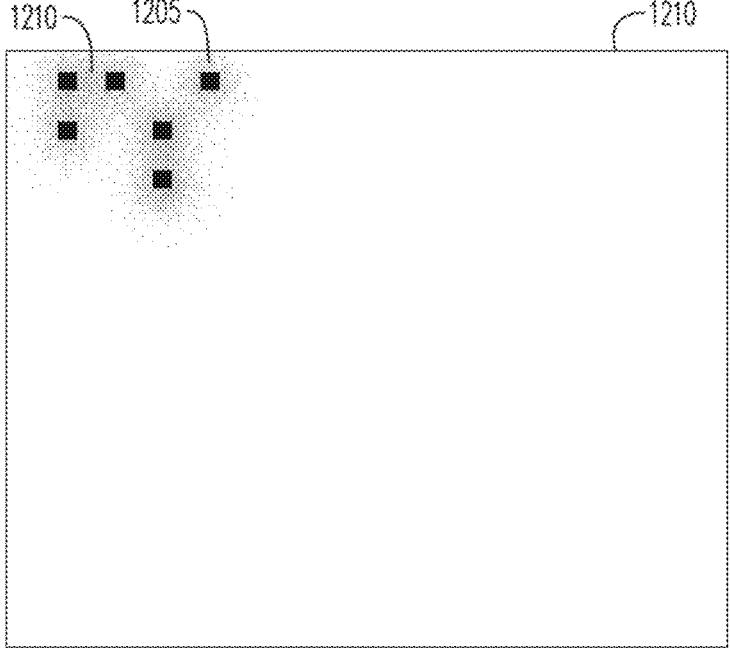
FIG. 12B illustrates a heat map generated for an agricultural area based on a plot showing areas of concern according to an embodiment.

FIG. 12B illustrates a heat map 1210 generated for an agricultural area based on the plot 1200 showing areas of concern 1205 according to an embodiment. The heat map 1210 again illustrates locations of concern 1205 depicted in the plot 1200 of FIG. 12A. The heat map 1210 includes a heat area 1215 disposed around areas of concern 1205. A radius of the heat area 1215 disposed around each area of concern 1205 may be dependent upon many factors, such as the type of crop, the type of disease and/or pest, and a magnitude of the amount of disease and/or pests detected, for example.

Figure 12C:
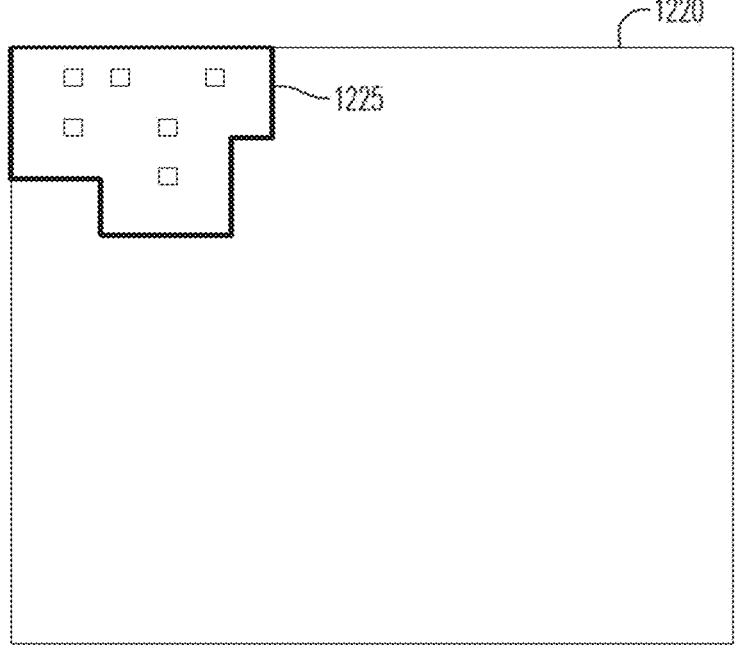
FIG. 12C illustrates a precision pesticide or fungicide application map generated for an agricultural area based on a heat map according to an embodiment.

FIG. 12C illustrates a pesticide application map 1220 generated for an agricultural area based on the heat map 1210 according to an embodiment. For example, the pesticide application map 1210 may show a bounded application area 1225 for which pesticide is suggested to be sprayed or otherwise applied. The boundaries or outline of bounded application area 1225 may encapsulate all the heat area 1215 shown in the heat map 1210 of FIG. 12B. The pesticide application map 1220 may show a person or computing device in charge of applying pesticides where such pesticides are to be applied in order to address a disease or pest issue.

Pursuant to some embodiments, the maps or plots shown in FIG. 12 may be generated by a control system such as the control system 1480 of FIG. 14 based on information received from one or more autonomous vehicles 100 which have executed one or more mission plans. The maps or plots may be transmitted from the control system 1480 to one or more user devices or other systems for analysis and to determine a course of action to resolve any areas of concern.

Figure 13:
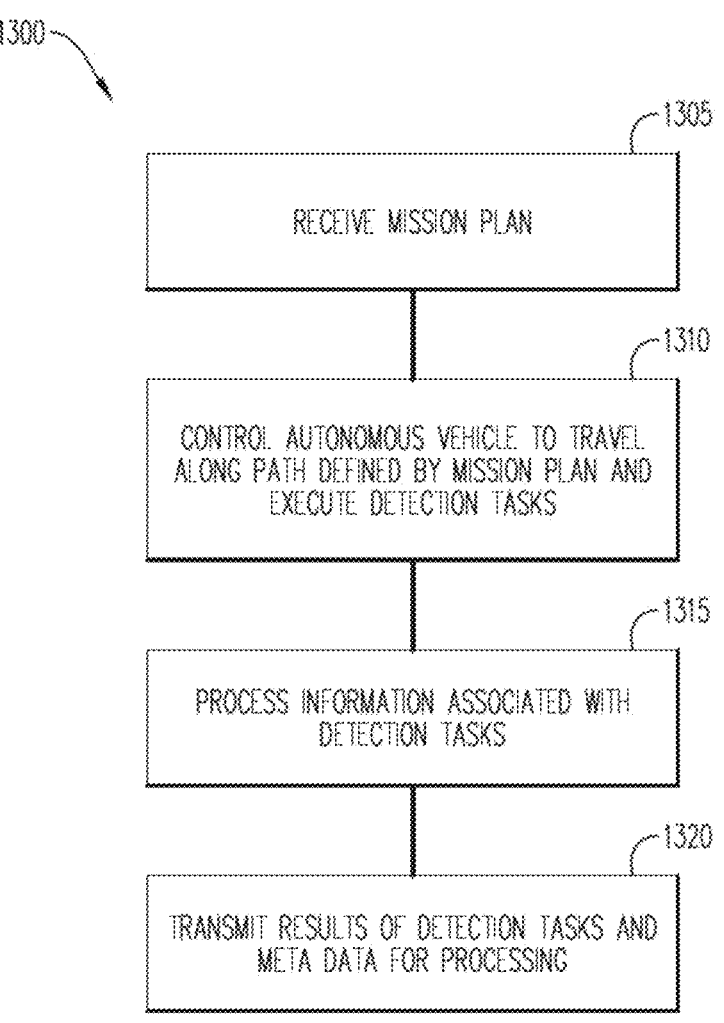
FIG. 13 illustrates a process pursuant to some embodiments.

FIG. 13 illustrates an embodiment 1300 of a method for acquiring and processing images or video by an autonomous vehicle 100. Embodiments in accordance with claimed subject matter may include all of, less than, or more than blocks 1305 through 1320. Also, the order of blocks 1305 through 1320 is merely an example order. For example, a method in accordance with embodiment 1300 may be performed by various components of the autonomous vehicle 100, such as the components of FIG. 14.

Processing begins at 1305 where a mission plan is received by the autonomous vehicle 100. The mission plan may be received by the autonomous vehicle 100 via a communication link between the autonomous vehicle 1000 and a control system (such as the control system 1480 of FIG. 14). The mission plan may be a file or other data which specifies information to be processed by the autonomous vehicle 100 in order to control the operation of the autonomous vehicle 100. For example, the mission plan may identify a path for autonomous vehicle 100 to travel through an agricultural field. The path may be defined by information specifying a plurality of waypoints (such as GPS locations). The mission plan may also include information specifying one or more detection tasks to be performed at various locations along the path. For example, a detection task may include operation of one or more cameras to capture one or more images and to process those images to determine whether the images indicate the presence of a pest or disease. Processing at 1305 may include operating the autonomous vehicle 100 to receive and store the details of the mission plan in a memory or storage (such as item 1410 of FIG. 14) and initialize components of the autonomous vehicle 100 to execute the mission plan.

Processing continues at 1310 where the autonomous vehicle 100 is controlled using a control system 1402 to travel along the path defined by the mission plan and to execute the detection tasks. This processing includes operating the controller 1408 to activate and operate components 1430 of a drive train of the autonomous vehicle 100 (e.g., such as the drive motors 1436, the steering motors 1434, etc.) to cause the autonomous vehicle 100 to travel along the path specified in the mission plan. The processing also includes operating the control system 1402 to activate and operate one or more detection components 1416 of the autonomous vehicle 100 to perform detection tasks specified in the mission plan. For example, one or more cameras 1420 may be operated to capture one or more images of a crop area.

Processing continues at 1315 where the autonomous vehicle 100 is operated to perform processing to process the information obtained from the detection task. For example, if the detection task performed at 1310 was to capture images of a crop area, processing at 1315 may include processing to analyze the images to detect the presence (or absence) of a pest or a disease. In some embodiments, this processing may include providing the images as inputs to one or more machine learning models to classify the image or to otherwise detect the presence or absence of a pest or disease. In some embodiments, the processing may further classify or identify the type of pest or disease. Other detection tasks may include processing to identify plant attributes such as leaf area, height, size of fruits, etc. Processing at 1315 includes associating each image with one or more items of meta data (such as the geographical location where the image was taken, a timestamp, etc.). Processing continues at 1320 where the results of the detection tasks are transmitted to a control system 1480 for further processing. For example, the control system 1480 may aggregate information from one or more mission plans executed by one or more autonomous vehicles 100 and produce one or more plots or heat maps (such as shown in FIG. 12). In some embodiments each time a detection task is performed, processing at 1315 is performed to process the information. In some embodiments, processing at 1315 may be performed as a background task while the autonomous vehicle 100 is completing a mission plan. In some embodiments, processing at 1315 may be performed after completion of a mission plan. In some embodiments, portions of, or all of the task of processing information associated with the detection tasks may be performed by a remote control system 1480.

FIG. 14 illustrates a system 1400 pursuant to some embodiments. The system 100 may include a control system 1480 which is in communication with one or more autonomous vehicles 100 thru existing or fit for purpose telemetry systems. For example, the control system 1480 may comprise one or more servers and associated communication services that are in communication with one or more autonomous vehicles 100. The control system 1480 may be deployed in a communications vehicle 240 such as shown in FIG. 2 or it may be deployed in another location (e.g., such as a cloud service such as Amazon Web Services or equivalents). The control system 1480 is in wireless communication with each autonomous vehicle 100 and information is transmitted over a wireless communication link. In some embodiments, the control system 1480 transmits a mission plan to an autonomous vehicle 100 for execution by the autonomous vehicle 100. The autonomous vehicle 100 then transmits the results of the performance of the mission plan to the control system 1480 for further processing. While not shown in FIG. 14, the control system 1480 may be in communication with one or more user devices allowing users to create mission plans, review results of mission plans, etc.

The autonomous vehicle 100 includes a number of components, including the mechanical components shown and described in conjunction with FIGS. 1-10, as well as the components shown in FIG. 14. For example, the autonomous vehicle 100 has a number of control components 1402 which operate to control the operation of the vehicle as well as to perform processing to analyze the results of any detection tasks. These control components 1402 include one or more processing or control units 1404, 1406, controllers 1408, data storage systems 1410, navigation modules 1412 communication modules 1414, and power modules 1416. Each of the components or modules may be in communication via one or more buses and network connections routed through the autonomous vehicle 100. The processing or control units 1404, 1406 may execute computer software code to implement one or more machine learning models to perform detection tasks as described herein.

The autonomous vehicle 100 also includes a number of detection components 1416 which are operable (under control of the control components 1402 and the mission plan) to capture information for use in detection tasks. For example, a number of cameras 1420, sensors 1422, and lighting modules 1424 are provided as discussed elsewhere herein. A number of different types of cameras 1420, sensors 1422 and lighting modules 1424 may be provided to support and perform detection tasks of the present invention. For example, a number of different types of cameras 1420 may be provided, including, for example, still or video capture, RGB, thermal band, multispectral, hyperspectral, LIDAR, etc.) For example, in some embodiments, sensors 1422 may be provided for detecting different odors (e.g., using volatile organic compound sensors), sound detection devices (e.g., to detect flight patterns of insects through ultra sound sensors), sampling devices (e.g., to obtain and analyze soil samples, leaf samples, or the like), etc. The cameras 1420, sensors 1422 and lighting devices 1424 may be used to support detection tasks as well as to enhance navigation as discussed elsewhere herein. The modular construction of the autonomous vehicle 100 allows these sensors, cameras and lighting devices to easily be installed, replaced and maintained through the removal of the exterior panels and use of the ports and power system of the present invention.

The autonomous vehicle 100 also includes a number of drive components 1430 which allow operation of the autonomous vehicle 100 under control of the control system 1402. The drive components 1430 include, for example, one or more suspension systems 1432, steering motors 1434 and drive motors 1436.

Figure 15:
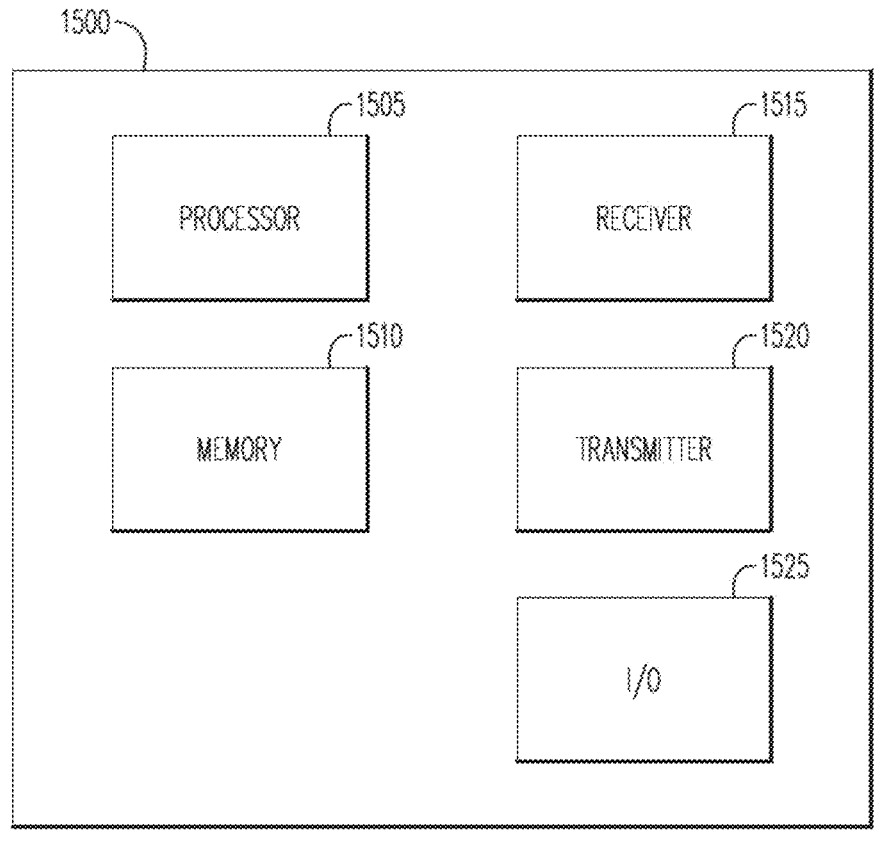
FIG. 15 illustrates a computing system for use in the embodiments described herein.

FIG. 15 illustrates an example computing system 1500 which may represent or be integrated in any of the above-described components, etc. FIG. 15 is not intended to suggest any limitation as to the scope of use or functionality of embodiments described herein. The computing system 1500 is capable of being implemented and/or performing any of the functionality set forth hereinabove. For example, a computing system such as shown in FIG. 15 may be implemented or deployed in the control system 1480 of FIG. 14, the communications vehicle 240 of FIG. 2, or any of the processors or systems of the autonomous vehicle 100 (e.g., such as the components of FIG. 14).

The computing system 1500 may include a computer system/server, which is operational with numerous other general purpose or special purpose computing system environments or configurations. Examples of well-known computing systems, environments, and/or configurations that may be suitable for use as computing system 1500 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 1500 may be a tokenization platform, server, CPU, GPU, or the like.

The computing system 1500 may be described in the general context of computer system-executable instructions, such as program modules, being executed by a computer system. Generally, program modules may include routines, programs, objects, components, logic, data structures, and so on that perform particular tasks or implement particular abstract data types. The computing system 1500 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 15, the computing system 1500 is shown in the form of a general-purpose computing device. The components of computing system 1500 may include, but are not limited to one or more processors or processing units 1505, a network interface or I/O 1525, which may include a port, an interface, etc., or other hardware, for outputting a data signal to another device such as a display, a printer, etc., and a storage device or memory 1510 which may include a system memory, or the like. Although not shown, the computing system 1500 may also include a system bus that couples various system components including system memory to the processor 1505.

The memory 1510 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, memory 1510 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 1510 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 1500 may also communicate with one or more external devices such as a keyboard, a pointing device, a display, etc.; one or more devices that enable a user to interact with computer system/ server; and/or any devices (e.g., network card, modem, etc.) that enable computing system 1500 to communicate with one or more other computing devices. Such communication can occur via I/O interfaces. Still yet, computing system 1500 can communicate with one or more networks such as a local area network (LAN), a general wide area network (WAN), and/or a public network (e.g., the Internet) via network interface (such as a receiver 1515 and a transmitter 1520). Although not shown, other hardware and/or software components could be used in conjunction with the computing system 1500. Examples include, but are not limited to: microcode, device drivers, redundant processing units, external disk drive arrays, RAID systems, tape drives, and data archival storage systems, etc.

As will be appreciated based on the foregoing specification, one or more aspects of the above-described examples of the disclosure may be implemented using computer programming or engineering techniques including computer software, firmware, hardware or any combination or subset thereof. Any such resulting program, having computer-readable code, may be embodied or provided within one or more non-transitory computer readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. An autonomous vehicle, comprising:
a top formed of one or more structural panels;
a first wall comprising at least a first upper portion and a first lower portion, the first lower portion coupled to a first side of the top and the first lower portion being coupled to a first set of wheels;
a second wall comprising at least a second upper portion and a second lower portion, the second upper portion being coupled to a second side of the top and the second lower portion being coupled to a second set of wheels, the first and second walls spaced apart from each other a distance to allow plants in a row of crops to pass between the first and the second walls, wherein the distance between the first and second walls is adjustable by replacing the one or more structural panels of the top;
at least a first camera positioned on the second wall to acquire images of at least a portion of an area around one or more plants in the row of crops; and
a processing system to:
receive a mission plan, the mission plan identifying a travel path with a number of waypoints and at least a first detection task to be performed;
control a drive system of the autonomous vehicle to cause operation of the first set of wheels and the second set of wheels to cause the autonomous vehicle to move along the travel path between the waypoints;
control a detection system of the autonomous vehicle to operate the at least first camera to capture images for the at least first detection task; and
transmit information associated with the performance of the at least first detection task to a control system for processing.

2. The autonomous vehicle of claim 1, further comprising at least a second camera positioned on the second wall to acquire images of at least a second portion of an area around one or more plants in the row of crops, the processing system further configured to control the detection system of the autonomous vehicle to operate the at least second camera to capture images for the at least first detection task.

3. The autonomous vehicle of claim 1, further comprising:
a first light source positioned proximate to the at least first camera, the first light source directing light toward an area of focus of the at least first camera.

4. The autonomous vehicle of claim 3, wherein the first light source is a light emitting diode (LED) panel shaped as at least one of: (i) a ring, (ii) a circle, (iii) a rectangle, and (iv) a square.

5. The autonomous vehicle of claim 3, wherein the processing system is further configured to control the detection system of the autonomous vehicle to operate the first light source in conjunction with the at least first camera in low light conditions.

6. The autonomous vehicle of claim 1, wherein the information associated with the performance of the at least first detection task includes at least: (i) a first image acquired by the at least first camera, (ii) a geolocation of the location of the autonomous vehicle when the first image was acquired, and (iii) a timestamp indicating the time and date when the first image was acquired.

7. The autonomous vehicle of claim 1, wherein the information associated with the performance of the at least first detection task includes at least: (i) a first image acquired by the at least first camera, (ii) a geolocation of the location of the autonomous vehicle when the first image was acquired, (iii) a timestamp indicating the time and date when the first image was acquired, and (iv) an output from a machine learning model indicating a predicted item detected by the at least first detection task.

8. The autonomous vehicle of claim 7, wherein the predicted item is an identification of at least one of: (i) a predicted pest, (ii) a predicted disease, (iii) a predicted nutritional deficiency (iv) a density of planting, (v) a morphology of the plant branch and leaf structure and that of its fruits, and (vi) an indicator of plant stress and fruit quality.

9. The autonomous vehicle of claim 1, wherein the first wall further comprises:
a leading edge extending diagonally from a first wheel of the first set of wheels upward to the roof, the leading edge wider in an area proximate the first wheel and narrower in an area proximate the top;
a trailing edge extending diagonally from a second wheel of the first set of wheels upward to the top, the trailing edge wider in an area proximate the second wheel and narrower in an area proximate the top;
a first bumper, the first bumper substantially covering the leading edge and a portion of a front of the first wheel;
a second bumper, the second bumper substantially covering the trailing edge and a portion of a front of the second wheel;
wherein the first and second bumpers prevent limbs and foliage of plants in the row of crops from being damaged by the first wall as the autonomous vehicle moves along the travel path.

10. The autonomous vehicle of claim 9, wherein the second wall further comprises:
a second leading edge extending diagonally from a first wheel of the second set of wheels upward to the top, the second leading edge wider in an area proximate the first wheel and narrower in an area proximate the top;
a second trailing edge extending diagonally from a second wheel of the second set of wheels upward to the top, the second trailing edge wider in an area proximate the second wheel and narrower in an area proximate the top;
a third bumper, the third bumper substantially covering the second leading edge and a portion of a front of the first wheel of the second set of wheels; and
a fourth bumper, the fourth bumper substantially covering the second trailing edge and a portion of a front of the second wheel of the second set of wheels;
wherein the third and fourth bumpers prevent limbs and foliage of plants in the row of crops from being damaged by the second wall as the autonomous vehicle moves along the travel path.

11. The autonomous vehicle of claim 1, wherein the first and second walls are each formed on a rectangular chassis with one or more panels removably attached to the rectangular chassis, the one or more panels and the rectangular chassis forming an interior portion.

12. The autonomous vehicle of claim 11, wherein the processing system is located in the interior portion of one of the first and the second walls.

13. The autonomous vehicle of claim 1, further comprising at least a first sensor positioned on at least one of the first and second walls, wherein the mission plan further identifies at least a second detection task to be performed and wherein the processing system is further configured to control the detection system of the autonomous vehicle to operate the at least first sensor to capture data for the at least second detection task.

14. The autonomous vehicle of claim 1, further comprising at least a second camera, the at least second camera positioned on an underside of the top to acquire images of a top portion of one or more plants in the row of crops, wherein the processing system is further configured to control the detection system of the autonomous vehicle to operate the at least second camera to capture images for the at least first detection task.

15. A system, comprising:

a control system, the control system generating at least a first mission plan defining a travel path within an agricultural field, the travel path including a number of waypoints and at least a first detection task to be performed;

an autonomous vehicle, in communication with the control system to receive the at least first mission plan over a wireless communication link, the autonomous vehicle including a top formed of one or more structural panels;

a first wall comprising at least a first upper portion and a first lower portion, the first lower portion coupled to a first side of the top and the first lower portion being coupled to a first set of wheels;

a second wall comprising at least a second upper portion and a second lower portion, the second upper portion being coupled to a second side of the top and the second lower portion being coupled to a second set of wheels, the first and second walls spaced apart from each other a distance to allow plants in a row of crops to pass between the first and the second walls, wherein the distance between the first and second walls is adjustable by replacing the one or more structural panels of the top;

at least a first camera positioned on the second wall to acquire images of at least a portion of an area around one or more plants in the row of crops;

a processing system to:

control a drive system of the autonomous vehicle to cause operation of the first set of wheels and the second set of wheels to cause the autonomous vehicle to move along the travel path between the waypoints;

control a detection system of the autonomous vehicle to operate the at least first camera to capture images for the at least first detection task; and transmit information associated with the performance of the at least first detection task to the control system for processing.

16. The system of claim 15, wherein the control system includes a processor configured to:

combine the information associated with the performance of the at least first detection task with information associated with the earlier performance of the at least first detection task in the agricultural field; and generate data indicating areas of interest in the agricultural field.

17. The system of claim 16, wherein the areas of interest include at least one of: (i) an area having undesirable pests, (ii) an area having undesirable disease, (iii) an area having undesirable nutritional deficiencies.

18. The system of claim 16, further comprising:

at least a second autonomous vehicle in communication with the control system to receive the at least first mission plan over a wireless communication link, the second autonomous vehicle operable to transmit information to the control system for processing.

19. A method, comprising:

adjusting a configuration of an autonomous vehicle, the autonomous vehicle having a top formed of one or more structural panels, a first wall having an upper portion coupled to a first side of the top, and a lower portion coupled to a first set of wheels, a second wall having a second upper portion coupled to a second side of the top and a second lower portion coupled to a second set of wheels, the first wall and second wall spaced apart from each other a distance to allow plants in a row of crops to pass between the first and second walls, wherein adjusting the configuration includes adjusting the distance between the first and second walls by replacing the one or more structural panels of the top;

receiving, by the autonomous vehicle, a mission plan identifying a travel path through an agricultural field, the travel path having a number of waypoints and information identifying a first detection task;

controlling a drive system of the autonomous vehicle to cause operation of the first and second set of wheels to cause the autonomous vehicle to move along the travel path between the waypoints;

controlling a detection system of the autonomous vehicle to operate at least a first camera to capture images for the at least first detection task; and transmitting information associated with the performance of the at least first detection task to a control system for processing.

\* \* \* \* \*